US012684124B2

(12) United States Patent     (10) Patent No.:   US 12,684,124 B2

De Lagrange et al.     (45) Date of Patent:     Jul. 14, 2026

(54) QUANTIZATION MATRIX PREDICTION FOR VIDEO ENCODING AND DECODING

(71) Applicant: InterDigital CE Patent Holdings, SAS, Paris (FR)

(72) Inventors: Philippe De Lagrange, Betton (FR); Fabrice Leleannec, Betton (FR); Edouard Francois, Bourg des Comptes (FR); Franck Galpin, Thorigne-Fouillard (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 18/923,315

(22) Filed: Oct. 22, 2024

(65) Prior Publication Data

US 2025/0047852 A1     Feb. 6, 2025

Related U.S. Application Data

(63) Continuation of application No. 17/634,346, filed as application No. PCT/EP2020/072195 on Aug. 6, 2020, now Pat. No. 12,160,577.

(30) Foreign Application Priority Data

| Aug. 14, 2019 | (EP) | ..................................... | 19306013 |
| Sep. 19, 2019 | (EP) | ..................................... | 19306127 |
| Sep. 26, 2019 | (EP) | ..................................... | 19306205 |

(51) Int. Cl.
    *H04N 19/103*     (2014.01)
    *H04N 19/124*     (2014.01)
    (Continued)

(52) U.S. Cl.
    CPC ......... *H04N 19/124* (2014.11); *H04N 19/103* (2014.11); *H04N 19/50* (2014.11); *H04N 19/70* (2014.11)

(58) Field of Classification Search
None
See application file for complete search history.

(56) References Cited

U.S. PATENT DOCUMENTS

| 8,768,077 | B2 | 7/2014 | Sato |
| 9,866,839 | B2 | 1/2018 | Lim et al. |
| (Continued) | | | |

FOREIGN PATENT DOCUMENTS

| CN | 104126304 A | 10/2014 |
| CN | 104488273 A | 4/2015 |
| (Continued) | | |

OTHER PUBLICATIONS

Amonou, et al., "Description of Video Coding Technology Proposal by France Telecom, NTT, NTT DOCOMO, Panasonic and Technicolor", JCTVC-A114, France Telecom S.A., NTT Corp., SNTT DOCOMO, Inc., Panasonic Corp., and Technicolor S.A., Joint Collaborative Team on Video Coding (JCT-VC) of ITU-T SG16 WP3 and ISO/IEC JTC1/SC29/WG11 1st Meeting: Dresden, DE, Apr. 15-23, 2010, pp. 1-42.

(Continued)

*Primary Examiner* — Samuel D Fereja

(74) *Attorney, Agent, or Firm* — Condo Roccia Koptiw LLP

(57) ABSTRACT

Decoding and/or encoding video information included in a bitstream can involve a predicted quantization matrix associated with at least a portion of the video information and a syntax element indicating that at least one coefficient of the predicted quantization matrix is to be interpreted as a residual such that the decoding and/or encoding of at least a portion of the video information is based on a combination of the predicted quantization matrix and the residual, where the syntax element is obtained from the bitstream during decoding, or included in the bitstream during encoding.

20 Claims, 14 Drawing Sheets

(51) Int. Cl.
  H04N 19/50 (2014.01)
  H04N 19/70 (2014.01)

(56) References Cited

U.S. PATENT DOCUMENTS

| | | | |
|---|---|---|---|
| 2014/0010279 A1 | 1/2014 | Rapaka et al. | |
| 2014/0064381 A1 | 3/2014 | Terada et al. | |
| 2014/0369408 A1 | 12/2014 | Tanaka et al. | |
| 2015/0078442 A1* | 3/2015 | Lim ................... | H04N 19/126 375/240.03 |
| 2018/0302621 A1 | 10/2018 | Fu et al. | |
| 2020/0404286 A1 | 12/2020 | Karczewicz et al. | |

FOREIGN PATENT DOCUMENTS

| | | | |
|---|---|---|---|
| CN | 108924571 A | 11/2018 |
| EP | 2136566 A1 | 12/2009 |
| EP | 2840791 A1 | 2/2015 |
| JP | 2011101420 A | 5/2011 |
| JP | 2012138883 A | 7/2012 |
| JP | 2013038758 A | 2/2013 |
| JP | 2015516754 A | 6/2015 |
| KR | 2011004623 4 A | 5/2011 |
| WO | 2005072312 A2 | 8/2005 |
| WO | 2013008459 A1 | 1/2013 |
| WO | 2020254317 A1 | 12/2020 |

OTHER PUBLICATIONS

Anonymous, "Generic Coding of Moving Pictures and Associated Audio information: Video", International Organization for Standardization (ISO) and the International Electrotechnical Commission (IEC), International Standard 13818-2, Recommendation ITU-T H.262, Document ISO 13818-2, 1995, 255 pages.

Bross, et al., "Versatile Video Coding (Draft 5)", JVET-N1001-V8, Editors, Joint Video Experts Team (JVET) of ITU-T SG 16 WP 3 and ISO/IEC JTC 1/SC 29/WG 11, 14th Meeting, Geneva, Switzerland, Mar. 19-27, 2019, 397 pages.

Chubach, et al., "CE7-related: Support of Quantization Matrices for VVC", JVET-N0847-v1, MediaTek Inc., Joint Video Experts Team (JVET) of ITU-T SG 16 WP 3 and ISO/IEC JTC 1/SC 29/WG 11, 14th Meeting: Geneva, CH, Mar. 19-27, 2019, pp. 1-4.

De Lagrange, et al., "Non-CE7: Quantization Matrices with Single Identifier and Prediction from Larger Ones", JVET-O0223, InterDigital Communications, Inc., Joint Video Experts Team (JVET) of ITU-T SG 16 WP 3 and ISO/IEC JTC 1/SC 29/WG 11, 15th Meeting: Gothenburg, SW=E, Jul. 3-12, 2019, 14 pages.

ITU-T, "Conformance Specification for ITU-T H.265 High Efficiency Video Coding", Recommendation ITU-T H.265.1, Series H: Audiovisual and Multimedia Systems, Infrastructure of Audiovisual Services—Coding of Moving Video, Oct. 2014, 42 pages.

ITU-T, "High Efficiency Video Coding", Recommendation ITU-T H.265, Series H: Audiovisual and Multimedia Systems, Infrastructure of Audiovisual Services—Coding of Moving Video, Apr. 2015, 636 pages.

ITU-T, "Transmission of Non-Telephone Siginals: Information Technology—Generic Coding of Moving Pictures and Associated Audio Information: Systems", Recommendation ITU-T H.222.0, International Telecommunication Union, ITU-T Telecommunication Standardization Sector of ITU, Jul. 1995, 135 pages.

Tanaka, et al., "Enhancement of Quantization Matrix Coding for HEVC", JCTVC-F475, Sony Corporation, Joint Collaborative Team on Video Coding (FCT-VC) of ITU-T SG16 WP3 and ISO/IEC JTC1/SC29/WG11, 6th Meeting: Torino, IT, Jul. 14-22, 2011, 12 pages.

Tanaka, et al., "Quantization Matrix for HEVC", JCTVC-E073, Sony Corporation, Joint Collaborative Team on Video Coding (JCT-VC) of ITU-T SG16 WP3 and ISO/IEC JTC1/SC29/WG11, 5th Meeting, Geneva, CH, Mar. 16-23, 2011, 24 pages.

Zhao, et al., "Cross-check of JVET-E0036 On Adaptive Multiple Core Transform for Chroma", JVET-E0073, Joint Video Exploration Team (JVET) of ITU-T SG 16 WP 3 and ISO/IEC JTC 1/SC 29/WG 11, 5th Meeting: Geneva, CH, Jan. 12-20, 2017, 2 pages.

* cited by examiner

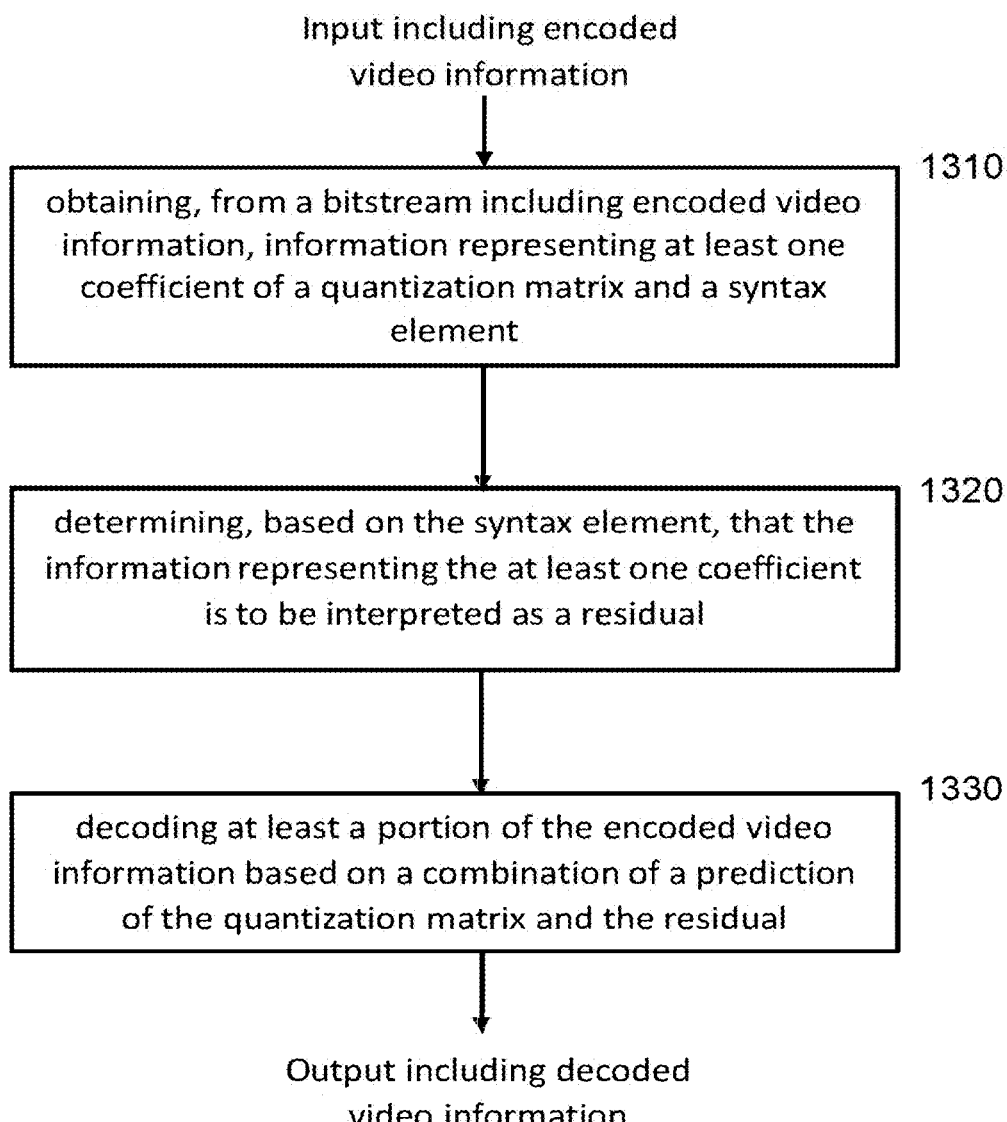

Input including encoded
video information obtaining, from a bitstream including encoded video
information, information representing at least one
coefficient of a quantization matrix and a syntax
element
1310 determining, based on the syntax element, that the
information representing the at least one coefficient
is to be interpreted as a residual
1320 decoding at least a portion of the encoded video
information based on a combination of a prediction
of the quantization matrix and the residual
1330

Output including decoded
video information

FIG. 13

Input including video
information

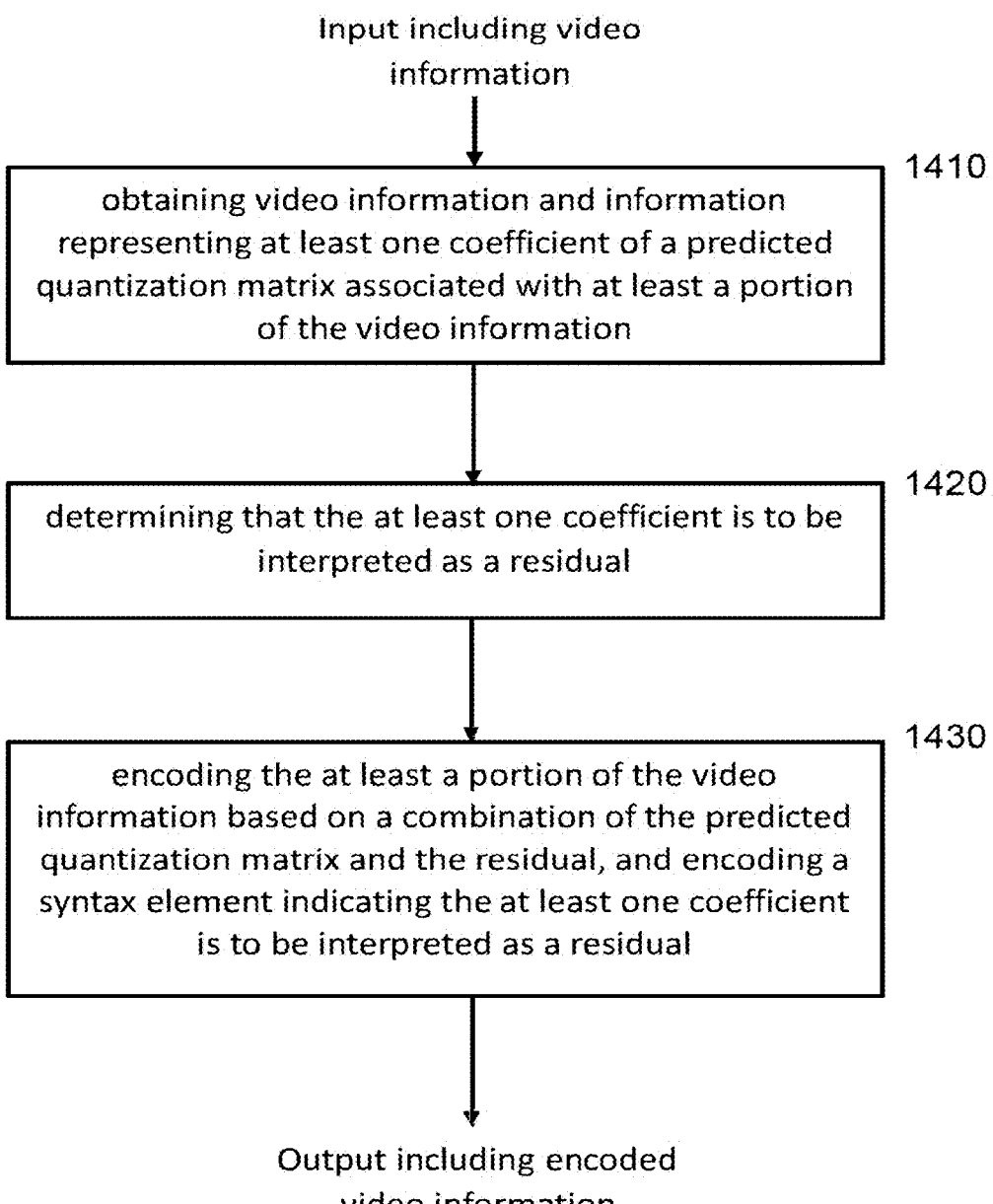

1410 obtaining video information and information
representing at least one coefficient of a predicted
quantization matrix associated with at least a portion
of the video information

1420 determining that the at least one coefficient is to be
interpreted as a residual

1430 encoding the at least a portion of the video
information based on a combination of the predicted
quantization matrix and the residual, and encoding a
syntax element indicating the at least one coefficient
is to be interpreted as a residual Output including encoded
video information

FIG. 14

QUANTIZATION MATRIX PREDICTION FOR VIDEO ENCODING AND DECODING

CROSS REFERENCE TO RELATED APPLICATIONS

This application is a continuation of U.S. patent application Ser. No. 17/634,346 (now U.S. Pat. No. 12,160,577), which is the National Stage Entry under 35 U.S.C. § 371 of Patent Cooperation Treaty Application No. PCT/EP2020/072195, filed Aug. 6, 2020, which claims priority from European Patent Application No. 19306013.4, filed Aug. 14, 2019, European Patent Application No. 19306127.2, filed Sep. 19, 2019, and European Patent Application No. 19306205.6, filed Sep. 26, 2019, the disclosures of each of which are incorporated by reference herein in their entireties.

TECHNICAL FIELD

The present disclosure involves video compression and, more specifically, a quantization step of video compression.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original picture block and the predicted picture block, often denoted as prediction errors or prediction residuals, are transformed, quantized and entropy coded. To reconstruct the video, the compressed data is decoded by inverse processes corresponding to the prediction, transform, quantization and entropy coding.

HEVC (High Efficiency Video Coding) is an example of a compression standard. HEVC was developed by Joint Collaborative Team on Video Coding (JCT-VC) (see, e.g., "ITU-T H.265 TELECOMMUNICATION STANDARD-IZATION SECTOR OF ITU (10/2014), SERIES H: AUDIOVISUAL AND MULTIMEDIA SYSTEMS, Infrastructure of audiovisual services-Coding of moving video, High efficiency video coding, Recommendation ITU-T H.265"). Another example of a compression standard is one under development by the Joint Video Experts Team (JVET) and associated with the development effort designated Versatile Video Coding (VVC). VVC is intended to provide improvements to HEVC.

SUMMARY

In general, at least one example of an embodiment can involve a method comprising: obtaining, from a bitstream including encoded video information, information representing at least one coefficient of a quantization matrix and a syntax element; determining, based on the syntax element, that the information representing the at least one coefficient is to be interpreted as a residual; and decoding at least a portion of the encoded video information based on a combination of a prediction of the quantization matrix and the residual.

In general, at least one example of an embodiment can involve apparatus comprising: one or more processors configured to obtain, from a bitstream including encoded video information, information representing at least one coefficient of a quantization matrix and a syntax element; determine, based on the syntax element, that the information representing the at least one coefficient is to be interpreted as a residual; and decode at least a portion of the encoded video information based on a combination of a prediction of the quantization matrix and the residual.

In general, at least one example of an embodiment can involve a method comprising: obtaining video information and information representing at least one coefficient of a predicted quantization matrix associated with at least a portion of the video information; determining that the at least one coefficient is to be interpreted as a residual; and encoding the at least a portion of the video information based on a combination of the predicted quantization matrix and the residual, and encoding a syntax element indicating the at least one coefficient is to be interpreted as a residual.

In general, at least one example of an embodiment can involve apparatus comprising: one or more processors configured to obtain video information and information representing at least one coefficient of a predicted quantization matrix associated with at least a portion of the video information; determine that the at least one coefficient is to be interpreted as a residual; and encode the at least a portion of the video information based on a combination of the predicted quantization matrix and the residual, and encoding a syntax element indicating the at least one coefficient is to be interpreted as a residual.

In general, another example of an embodiment can involve a bitstream formatted to include picture information, wherein the picture information is encoded by processing the picture information based on any one or more of the examples of embodiments of methods in accordance with the present disclosure.

In general, one or more other examples of embodiments can also provide a computer readable storage medium, e.g., a non-volatile computer readable storage medium, having stored thereon instructions for encoding or decoding picture information such as video data according to the methods or the apparatus described herein. One or more embodiments can also provide a computer readable storage medium having stored thereon a bitstream generated according to methods or apparatus described herein. One or more embodiments can also provide methods and apparatus for transmitting or receiving the bitstream generated according to methods or apparatus described herein.

Various modifications and embodiments are envisioned as explained below that can provide improvements to a video encoding and/or decoding system including but not limited to one or more of increased compression efficiency and/or coding efficiency and/or processing efficiency and/or decreased complexity.

The above presents a simplified summary of the subject matter in order to provide a basic understanding of some aspects of the present disclosure. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description provided below.

BRIEF DESCRIPTION OF THE DRAWINGS

The present disclosure may be better understood by considering the detailed description below in conjunction with the accompanying figures, in which.

DETAILED DESCRIPTION

Figure 1:
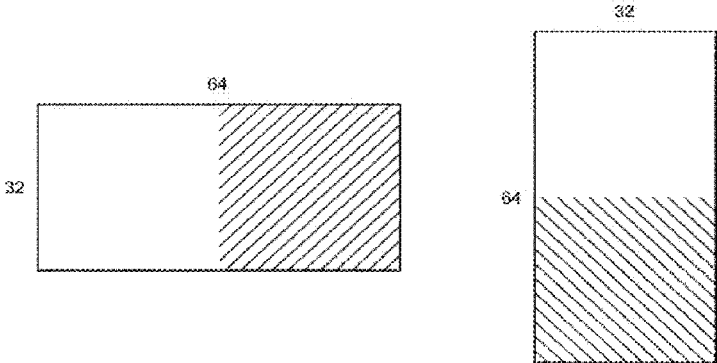
FIG. 1 shows an example of transform/quantization coefficients inferred to zero for block sizes larger than 32 in VVC.

The HEVC specification allows the use of quantization matrices in the dequantization process, where coded block frequency-transformed coefficients are scaled by the current quantization step and further scaled by a quantization matrix (QM) as follows:

$$d[x][y] =$$

$$Clip3\big(coeff\text{Min}, Coeff\text{Max}, ((TransCoeffLevel[xTbY][yTbY][cIdx][x][y] *$$

$$m[x][y] * levelScale[qP \% 6] << (qP/6)) + (1 << (bdShift - 1))) >> bdShift\big)$$

where:

TransCoeffLevel [ . . . ] are the transformed coefficients absolute values for the current block identified by its spatial coordinates xTbY, yTbY and its component index cIdx.

x and y are the horizontal/vertical frequency indices.

qP is the current quantization parameter.

the multiplication by levelScale [qP % 6] and left shift by (qP/6) is the equivalent of the multiplication by quantization step qStep=(levelScale [qP % 6]<< (qP/6))

m [ . . . ][ . . . ] is the two-dimensional quantization matrix bdShift is an additional scaling factor to account for image sample bit depth. The term (1<<(bdShift−1)) serves the purpose of rounding to the nearest integer.

d [ . . . ] are the resulting dequantized transformed coefficients absolute values.

The syntax used by HEVC to transmit quantization matrices is the following:

| | Descriptor |
|---|---|
| scaling_list_data( ) { | |
|   for( sizeId = 0; sizeId < 4; sizeId++ ) | |
|     for( matrixId = 0; matrixId < 6; matrixId += ( sizeId == 3 ) ? 3 : 1 ) { | |
|       scaling_list_pred_mode_flag[ sizeId ][ matrixId ] | u(1) |
|       if( !scaling_list_pred_mode_flag[ sizeId ][ matrixId ] ) | |
|         scaling_list_pred_matrix_id_delta[ sizeId ][ matrixId ] | ue(v) |
|       else { | |
|         nextCoef = 8 | |
|         coefNum = Min( 64, ( 1 << ( 4 + ( sizeId << 1 ) ) ) ) | |
|         if( sizeId > 1 ) { | |
|           scaling_list_dc_coef_minus8[ sizeId − 2 ][ matrixId ] | se(v) |
|           nextCoef = scaling_list_de_coef_minus8[ sizeId − 2 ][ matrixId ] + 8 | |
|         } | |
|         for( i = 0; i < coefNum; i++) { | |
|           scaling_list_delta_coef | se(v) |
|           nextCoef = ( nextCoef + scaling_list_delta_coef + 256 ) % 256 | |
|           ScalingList[ sizeId ][ matrixId ][ i ] = nextCoef | |
|         } | |
|       } | |
|     } | |
| } | |

FIG. 13 illustrates another example of an embodiment of a decoder in accordance with the present description; and FIG. 14 illustrates another example of an embodiment of an encoder in accordance with the present description.

It should be understood that the drawings are for purposes of illustrating examples of various aspects and embodiments and are not necessarily the only possible configurations. Throughout the various figures, like reference designators refer to the same or similar features.

It can be noted that:

A different matrix is specified for each transform size (sizeId)

For a given transform size, six matrices are specified, for intra/inter coding and Y/Cb/Cr components A matrix can be either:

Copied from a previously transmitted matrix of the same size, if scaling_list_pred_mode_flag is zero (the reference matrixId is obtained as matrixId-scaling_list_pred_matrix_id_delta)

Copied from default values specified in the standard (if both scaling_list_pred_mode_flag and scaling_list_pred_matrix_id_delta are zero)

Fully specified in DPCM coding mode, using exp-Golomb entropy coding, in up-right diagonal scanning order.

For block sizes greater than 8×8, only 8×8 coefficients are transmitted for signaling the quantization matrix in order to save coded bits. Coefficients are then interpolated using zero-hold (i.e., repetition), except for DC coefficient which is transmitted explicitly.

The use of quantization matrices similar to HEVC has been adopted in VVC draft 5 based on contribution JVET-N0847 (see O. Chubach, T. Toma, S. C. Lim, et al., "CE7-related: Support of quantization matrices for VVC", JVET-N0847, Geneva, C H, March 2019). The scaling_list_data syntax has been adapted to the VVC codec as shown below.

TABLE 2

| QM type identifier (JVET-N0847) | | |
| --- | --- | --- |
| CuPredMode | cIdx (Colour component) | matrixId |
| MODE_INTRA | 0 (Y) | 0 |
| MODE_INTRA | 1 (Cb) | 1 |
| MODE_INTRA | 2 (Cr) | 2 |
| MODE_INTER | 0 (Y) | 3 |
| MODE_INTER | 1 (Cb) | 4 |
| MODE_INTER | 2 (Cr) | 5 |

NOTE:

MODE_INTER QMs are also used for MODE_IBC (Intra Block Copy).

|  | Descriptor |
| --- | --- |

```
scaling_list_data( ) {
  for( sizeId = 1; < 7; sizeId++ )
    for( matrixId = 0; matrixId < 6; matrixId ++ ) {
      if( ! ( (( sizeId == 1 ) && ( matrixId % 3 == 0 ) ) || (( sizeId == 6 ) && ( matrixId % 3 !=
0 ) ) ) ) {
        scaling_list_pred_mode_flag[ sizeId ][ matrixId ]                              u(1)
        if( !scaling_list_pred_mode_flag[ sizeId ][ matrixId ] )
          scaling_list_pred_matrix_id_delta[ sizeId ][ matrixId ]                      ue(v)
        else {
          nextCoef = 8
          coefNum = Min( 64, ( 1 << ( sizeId << 1 ) ) )
          if( sizeId > 3 ) {
            scaling_list_dc_coef_minus8[ sizeId – 4 ][ matrixId ]                      se(v)
            nextCoef = scaling_list_dc_coef_minus8[ sizeId – 4 ][ matrixId ] + 8
          }
          for( i = 0; i < coetNum; i++ ) {
            x = DiagScanOrder[ 3 ][ 3 ][ i ][ 0 ]
            y = DiagScanOrder[ 3 ][ 3 ][ i ][ 1 ]
            if ( !(sizeId==6 && x>=4 && y>=4) ) {
              scaling_list_delta_coef                                                  se(v)
              nextCoef = ( nextCoef + scaling_list_delta_coef + 256 ) % 256
              ScalingList[ sizeId ][ matrixId ][ i ] = nextCoef
            }
          }
        }
      }
    }
}
```

Compared to HEVC, VVC needs more quantization matrices due to a higher number of block sizes.

In VVC draft 5 (with JVET-N0847 adoption), as in HEVC, a QM is identified by two parameters, matrixId and sizeId. This is illustrated in the following two tables.

TABLE 1

| Block size identifier (JVET-N0847) | | |
| --- | --- | --- |
| Luma | Chroma | sizeId |
| — | — | 0 |
| — | 2 × 2 | 1 |
| 4 × 4 | 4 × 4 | 2 |
| 8 × 8 | 8 × 8 | 3 |
| 16 × 16 | 16 × 16 | 4 |
| 32 × 32 | 32 × 32 | 5 |
| 64 × 64 | — | 6 |

The combination of both identifiers is shown in the following table:

TABLE 3

| (matrixId, sizeId) combinations (JVET-N0847) | | | | | | |
| --- | --- | --- | --- | --- | --- | --- |
| INTRA | Y |  | 0, 2 | 0, 3 | 0, 4 | 0, 5 | 0, 6 |
|  | Cb | 1, 1 | 1, 2 | 1, 3 | 1, 4 | 1, 5 |  |
|  | Cr | 2, 1 | 2, 2 | 2, 3 | 2, 4 | 2, 5 |  |
| INTER | Y |  | 3, 2 | 3, 3 | 3, 4 | 3, 5 | 3, 6 |
|  | Cb | 4, 1 | 4, 2 | 4, 3 | 4, 4 | 4, 5 |  |
|  | Cr | 5, 1 | 5, 2 | 5, 3 | 5, 4 | 5, 5 |  |
| Block size: max(width, height) |  | 2 | 4 | 8 | 16 | 32 | 64 |
| Signaled QM coefficients |  | 2 × 2 | 4 × 4 | 8 × 8 | 8 × 8 + DC | | |

As in HEVC, for block sizes greater than 8×8, only 8×8 coefficients+DC are transmitted. QM of the correct size is reconstructed using zero-hold interpolation. For example, for a 16×16 block, every coefficient is repeated twice in bothdirections, then the DC coefficient is replaced by the transmitted one.

For rectangular blocks, the size retained for QM selection (sizeId) is the larger dimension, i.e., maximum of width and height. For example, for a 4×16 block, a QM for 16×16 block size is selected. Then, the reconstructed 16×16 matrix is decimated vertically by a factor 4 to obtain the final 4×16 quantization matrix (i.e., three lines out of four are skipped).

For the following, we refer to QMs for a given family of block sizes (square or rectangular) as size-N, in relation to sizeId and the square block size it is used for: for example, for block sizes 16×16 or 16×4, the QMs are identified as size-16 (sizeId 4 in VVC draft 5). The size-N notation is used to differentiate from exact block shape, and from the number of signaled QM coefficients (limited to 8×8, as shown in table 3).

Furthermore, in VVC draft 5, for size-64, QM coefficients for the bottom-right quadrant are not transmitted (they are inferred to 0, which is called "zero-out" in the following). This is implemented by the "x>=4 && y>=4" condition in the scaling_list_data syntax. This avoids transmitting QM coefficients that are never used by the transformation/quantization process. Indeed, in VVC, for transform block sizes larger than 32 in any dimension (64×N, N×64, with N<=64), any transformed coefficient with x/y frequency coordinate larger or equal to 32 is not transmitted and inferred to zero. Consequently, no quantization matrix coefficient is needed to quantize it. This is illustrated in FIG. 1, where the hatched area corresponds to transform coefficients inferred to zero.

In general, an aspect of at least one embodiment described herein can involve saving bits in the transmission of custom QMs, while keeping the specification as simple as possible. In general another aspect of the present disclosure can involve improving QM prediction, so that simple adjustments are possible with low bit cost.

Figure 2:
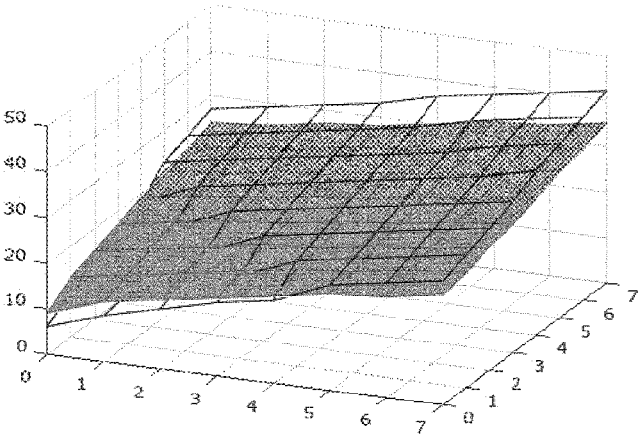
FIG. 2 shows a comparison of intra and inter default quantization matrices in H.264 (top: inter (solid) and intra (grid); bottom: inter (solid), intra scaled (grid))
Figure 2:
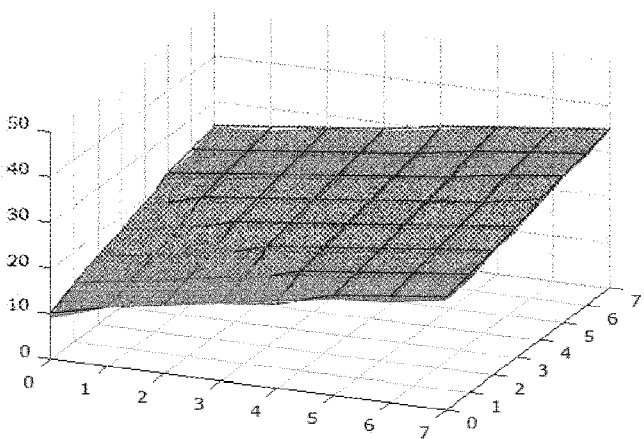

For example, two common adjustments applied to QM are:

the control of dynamic range (ratio between lowest value—usually for low frequencies, and highest value—usually for high frequencies), which is easily achieved with global scaling of matrix coefficients around a neutral value of choice; and a general offset to either fine-tune the bitrate, extend QP range, or balance quality between different transform sizes One example is the "intra" and "inter" 8×8 default matrices for h264 illustrated in FIG. 2. FIG. 2 shows a comparison of intra and inter default h264 matrices. The top illustration in FIG. 2 shows inter (solid) and intra (grid). The bottom illustration in FIG. 2 shows inter (solid) and intra scaled (grid). In FIG. 2, "inter" matrix is merely a scaled version of the "intra" one where "intra scaled" is (intra_QM−16)*11/16+17.

Figure 3:
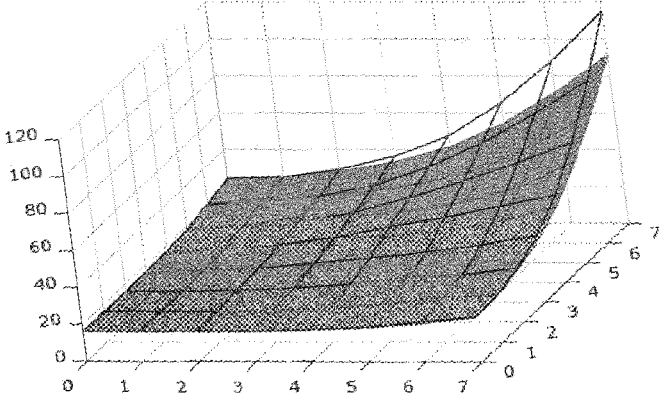
FIG. 3 shows a comparison of intra and inter default quantization matrices in HEVC (top: inter (solid) and intra (grid); bottom: inter (solid), intra scaled (grid))
Figure 3:
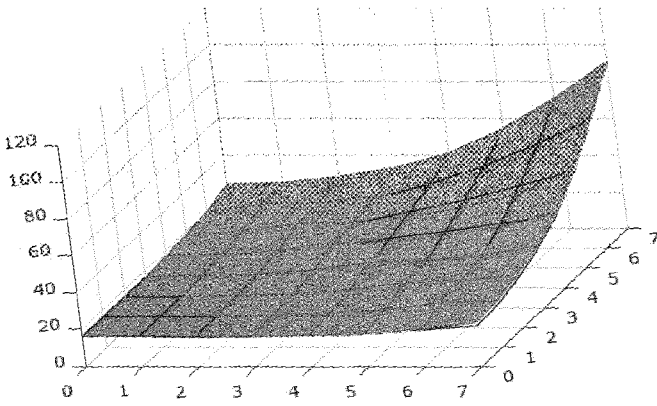

A similar trend is observed for HEVC 8×8 default matrices, as illustrated in FIG. 3.

FIG. 3 shows a comparison of intra and inter default h264 matrices. The top illustration in FIG. 3 shows inter (solid) and intra (grid). The bottom illustration in FIG. 3 shows inter (solid) and intra scaled (grid) where "intra scaled" is (intra_QM-16)*12/16+16).

Such simple adjustments require full recoding of matrices in HEVC and VVC, which can be costly (for example, 240 bits to code the scaled HEVC intra matrix shown above). Also, in both HEVC and VVC, prediction (=copy) and explicit QM coefficients are mutually exclusive. That is, refining prediction is not possible.

In the VVC context, modifications of QM syntax and prediction have been proposed. For example, in one proposal (JVET-00223), QMs are transmitted from larger to smaller order, and allow prediction from all previously transmitted QMs, including from QMs intended for larger block size. Prediction here means copy, or decimation if the reference is larger. This takes advantage of similarity between QMs of same type (Y/Cb/Cr, Intra/Inter) but intended for different block sizes. The QM index matrixId included in the described proposal is a compound of a size identifier sizeId (shown in Table 4) and a type identifier matrix TypeId (shown in Table 5), that are combined using the following equation, which results in the unique identifier matrixId show in Table 6.

$$matrixId = 6 * sizeId + matrixTypeId \qquad (3-1)$$

TABLE 4

Size identifier (JVET-O0223)

| Luma | Chroma | sizeId |
|---|---|---|
| 64 × 64 | 32 × 32 | 0 |
| 32 × 32 | 16 × 16 | 1 |
| 16 × 16 | 8 × 8 | 2 |
| 8 × 8 | 4 × 4 | 3 |
| 4 × 4 | 2 × 2 | 4 |

TABLE 5

Matrix type identifier (JVET-O0223)

| CuPredMode | cIdx (Colour component) | matrixTypeId |
|---|---|---|
| MODE_INTRA | 0 (Y) | 0 |
| MODE_INTER | 0 (Y) | 1 |
| MODE_INTRA | 1 (Cb) | 2 |
| MODE_INTER | 1 (Cb) | 3 |
| MODE_INTRA | 2 (Cr) | 4 |
| MODE_INTER | 2 (Cr) | 5 |

TABLE 6 unified matrixId (JVET-O0223)

| | | 64 | 32 | 16 | 8 | 4 | 2 |
|---|---|---|---|---|---|---|---|
| Y | INTRA | 0 | 6 | 12 | 18 | 24 | |
| | INTER | 1 | 7 | 13 | 19 | 25 | |
| Cb | INTRA | | 2 | 8 | 14 | 20 | 26 |
| | INTER | | 3 | 9 | 15 | 21 | 27 |
| Cr | INTRA | | 4 | 10 | 16 | 22 | 28 |
| | INTER | | 5 | 11 | 17 | 23 | 29 |
| TU size: luma max(width, height) | | 64 | 32 | 16 | 8 | 4 | |
| Block size: max(width, height) | | 64 | 32 | 16 | 8 | 4 | 2 |
| Signalled QM size | | 8 × 8 + DC | | 8 × 8 | | 4 × 4 | 2 × 2 |

And the syntax is modified as indicated by underlining in the following:

| | Descriptor |
|---|---|
| scaling_list_data( ) { | |
|   for( matrixId = 0; matrixId < 30; matrixId++ ) { | |
|     scaling_list_pred_mode_flag[ matrixId ] | u(1) |
|     if ( !scaling_list_pred_mode_flag[ matrixId ]) | |
|       scaling_list_pred_matrix_id_delta[[ matrixId ] | ue(v) |
|     else { | |
|       nextCoef = 8 | |
|       coefNum = (matrixId < 20) ? 64 : (matrixId < 26) ? 16 : 4 | |
|       if (matrixId <14) { | |
|         scaling_list_dc_coef_minus8[[ matrixId ] | se(v) |
|         nextCoef = scaling_list_dc_coef_minus8[[ matrixId ] + 8 | |
|       } | |
|       for( i = 0; i < coefNum; i++ ) { | |
|         scaling_list_delta_coef | se(v) |
|         nextCoef = ( nextCoef + scaling_list_delta_coef + 256 ) % 256 | |
|         ScalingList[ matrixId ] [ i ] = nextCoef | |
|       } | |
|     } | |
|   } | |
| } | |

Figure 4:
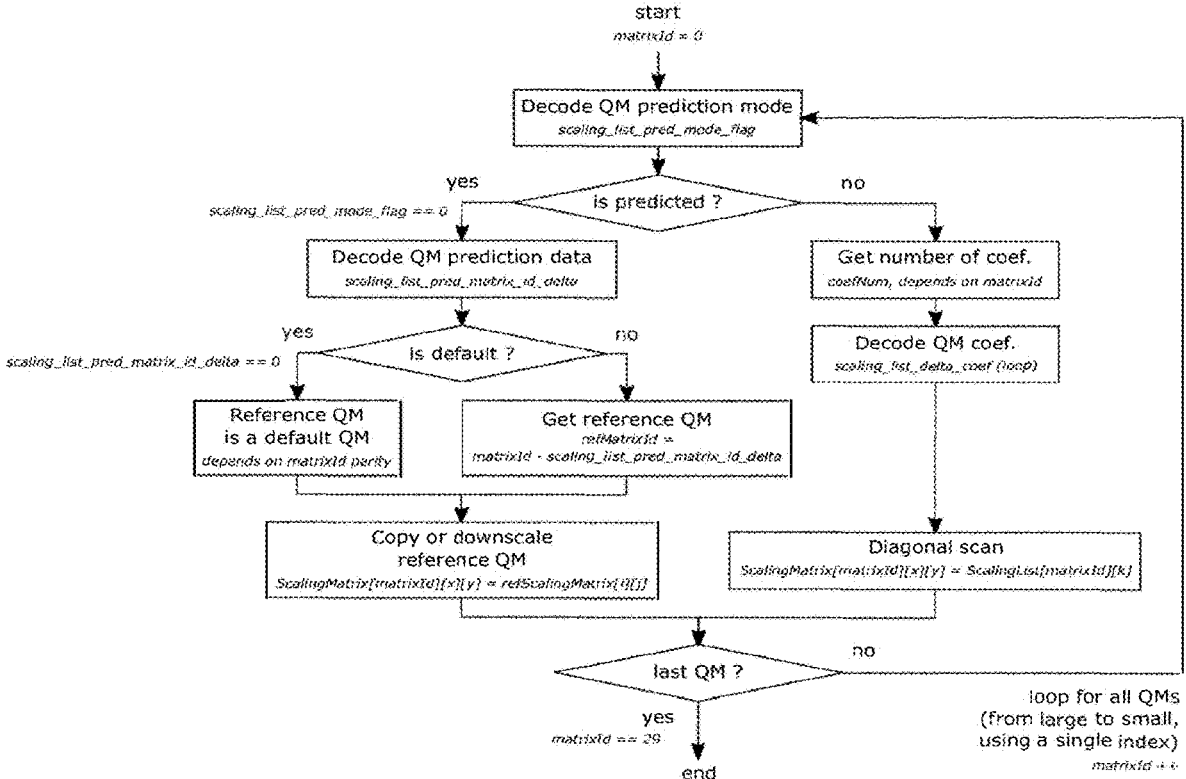
FIG. 4 illustrates an example of quantization matrix (QM) decoding workflow.

The QM decoding workflow is illustrated in FIG. 4. In FIG. 4:

Input is the coded bitstream.

Output is an array of ScalingMatrix.

"Decode QM prediction mode": get a prediction flag from the bitstream.

"is predicted?": determine if the QM is inferred (predicted) or signaled in the bitstream, depending on aforementioned flag.

"Decode QM prediction data": get prediction data from the bitstream, needed to infer the QM when not signaled, e.g. a QM index difference scaling_list_pred_matrix_id_delta "is default": determine if the QM is predicted from default values (e.g. if scaling_list_pred_matrix_id_delta is zero), or from a previously decoded QM "Reference QM is a default QM": select a default QM as reference QM. There can be several default QMs to choose from, e.g. depending on the parity of matrixId.

"Get reference QM": select a previously decoded QM as reference QM. The index of the reference QM is derived from matrixId and aforementioned index difference.

"Copy or downscale reference QM": predict QM from reference QM. Prediction comprises a simple copy if reference QM is the correct size, or a decimation if it is larger than expected. Result is stored in ScalingMatrix [matrixId].

"Get number of coef.": determine the number of QM coefficients to be decoded from the bitstream, depending on matrixId. For example: 64 if matrixId is lower than 20, 16 if matrixId is between 20 and 25, 4 otherwise.

"Decode QM coef.": decode the relevant number of QM coefficients from the bitstream "Diagonal scan": organize the decoded QM coefficients in a 2D matrix. Result is stored in ScalingMatrix [matrixId]

"last QM": either loop or stop when all QMs are decoded from the bitstream.

Details about the DC value are omitted for the sake of clarity.

The proposal described above (JVET-O0223) attempts to reduce the bit cost of coding custom QMs in the context of VVC, by enabling prediction from a QM with different sizeId. However, prediction is limited to copy (or decimation).

In the HEVC context, JCTVC-A114 (a response to the HEVC Call for Proposal) has proposed an inter-QM prediction technique with scaling capability. The following syntax and semantics are found in JCTVC-A114 annex A, with the most relevant part shown in bold face:

| Description | Type | Context |
|---|---|---|
| qscalingmatrix_update (SetId, MatrixId, MaxCoeff) { | | |
|   qscalingmatrix_update_type_flag | uint(1)/ac | 50/50 |
|   if( qscalingmatrix_update_type_flag ) { | | |
|     lastScale = 8 | | |
|     nextScale = 8 | | |
|     for( j = 0; j < MaxCoeff; j++ ) { | | |
|       if( nextScale != 0 ) { | | |
|         delta_scale | uint(v)/ac | 50/50 |
|         nextScale = ( lastScale + delta_scale + 256 ) % 256 | | |
|         useDefaultScalingMatrixFlag = ( j = = 0 && nextScale = = 0 ) | | |
|       } | | |
|       scalingmatrix[ j ] = ( nextScale = = 0 ) ? lastScale : nextScale | | |
|       lastScale = scalingmatrix [ j ] | | |
|     } | | |

-continued

| Description | Type | Context |
|---|---|---|
|    nextScale = ( lastScale + delta scale + 256 ) % 256 | | |
|    useDefaultScalingMatrixFlag = ( j = = 0 && nextScale = = 0 ) | | |
|   } else { | | |
|     matrix_scale | uint(v)/ac | 50/50 |
|     matrix_slope | uint(v)/ac | 50/50 |
|     num_delta_scale | uint(v)/ac | 50/50 |
|     for( j = 0; j < num_delta_scale; j++ ) { | | |
|       delta_scale | uint(v)/ac | 50/50 |
|     } | | |
|   } | | |
| } | | | where:

qscalingmatrix_update_type_flag: indicates the methods to update the scaling matrixes. A value 0 means a new matrix is adapted from existing matrix and a value 1 means a new matrix is retrieved from a header.

delta_scale: indicates a delta scale value. The delta_scale values are decoded in the zig-zag scanning order. If not present, the default value for delta_scale is equal to zero.

matrix_scale: indicates a parameter to scale all the matrix values.

matrix_slope: indicates a parameter to adjust the gradient of a non-flat matrix.

num_delta_scale: indicates the number of delta_scale values to be decoded when qscalingmatrix_update_type_flag equal to 0.

Depending on qscalingmatrix_update_type_flag, the values of scaling matrix ScaleMatrix is defined as follows:

If qscalingmatrix_update_type_flag is equal to 0, $$\text{ScaleMatrix}[\,i\,] = (\,\text{ScaleMatrix}[\,i\,] * (\text{matrix\_scale} + 16) +$$

$$\text{matrix\_slope} * (\text{ScaleMatrix}[\,i\,] - 16) + 8) \gg 4) + \text{delta\_scale},$$

with i=0 . . . . MaxCoeff

Otherwise (qscalingmatrix_update_type_flag is equal to 1)

ScaleMatrix [i] is derived as shown in Section 5.10.

Note—ScaleMatrix [i] is equal to 16 by default.

Although the approach of JCTVC-A114 enables QM prediction with a scaling factor and variable-length residual, there are two redundant scaling factors and no simple way to specify a global offset (one would have to code all delta_scale values since they are not DPCM-coded).

In general, at least one aspect of the present disclosure can involve one or more of extending the prediction of QMs by applying a scale factor in addition to copy and downsampling, providing a simple way to specify a global offset, or allowing refining prediction with a variable-length residual.

In general, at least one aspect of the present disclosure can involve combining improved prediction with a residual, to further refine QMs, with potentially lower cost than full coding.

In general, at least one example of an embodiment in accordance with the present disclosure can comprise QM prediction with offset in addition to copy/downscale.

In general, at least one example of an embodiment in accordance with the present disclosure can comprise QM prediction plus (variable-length) residual.

In general, at least one example of an embodiment in accordance with the present disclosure can comprise QM prediction with scale factor in addition to copy/downscale.

In general, at least one example of an embodiment in accordance with the present disclosure can comprise a combination of scale factor with either offset or residual.

In general, at least one example of an embodiment in accordance with the present disclosure can provide for reducing the number of bits needed to transmit QMs, and allow user-defined trade-off between accuracy and bit cost, while keeping specification simple.

In general, at least one example of an embodiment in accordance with the present disclosure can comprise one or more of the following features to provide for reducing the number of bits needed to transmit QMs, and allow user-defined trade-off between accuracy and bit cost, while keeping specification simple:

Add a residual to QM prediction
Add a scaling factor to QM prediction
Combine residual and scaling
Always use prediction (remove prediction mode flag)

Examples of various embodiments are provided below that incorporate one or more of the described features and aspects. The following examples are presented in the form of syntax and text descriptions based on the VVC draft 5 including proposal JVET-O0223. However, this context is merely an example selected for ease and clarity of description and does not restrict either the scope of this disclosure or the scope of application of the principles described herein. That is, the same principles can be applied in many different contexts as will be apparent to one skilled in the art, e.g., to HEVC or VVC draft 5, to QMs interpreted as QP-offsets instead of scaling factors, to QMs coefficients coded with 7 bits instead of 8, etc.

In general, at least one example of an embodiment comprises a modification on top of copy for QM prediction comprising adding a global offset. As an example, a global offset can be specified explicitly as indicated in the following modification of syntax and specification text based on VVC draft 5 including JVET-O0223, wherein additions are underlined and deletions are lined-through.

| | Descriptor |
|---|---|
| scaling_list_data( ) { | |
|   for( matrixId = 0; matrixId <30; matrixId++ ) { | |

-continued

| | Descriptor |
|---|---|
| scaling_list_pred_mode_flag[ matrixId ] | u(1) |
| if ( !scaling_list_pred_mode_flag[ matrixId ] ) | |
|     scaling_list_pred_matrix_id_delta[ matrixId ] | ue(v) |
|     <u>scaling_list_pred_offset[[ matrixId ]</u> | <u>se(v)</u> |
| else { | |
|     nextCoef = 8 | |
|     coefNum = (matrixId < 20) ? 64 : (matrixId < 26) ? 16 : 4 | |
|     if ( matrixId < 14 ) { | |
|         scaling_list_dc_coef_minus8[ matrixId ] | se(v) |
|         nextCoef = scaling_list_dc_coef_minus8[ matrixId ] + 8 | |
|     } | |
|     for( i = 0; i < coefNum; i++ ) { | |
|         scaling_list_delta_coef | se(v) |
|         nextCoef = ( nextCoef + scaling_list_delta_coef + 256 ) % 256 | |
|         ScalingList[ matrixId ][ i ] = nextCoef | |
|     } | |
|   } | |
|  } | |
| } | |

Figure 5:
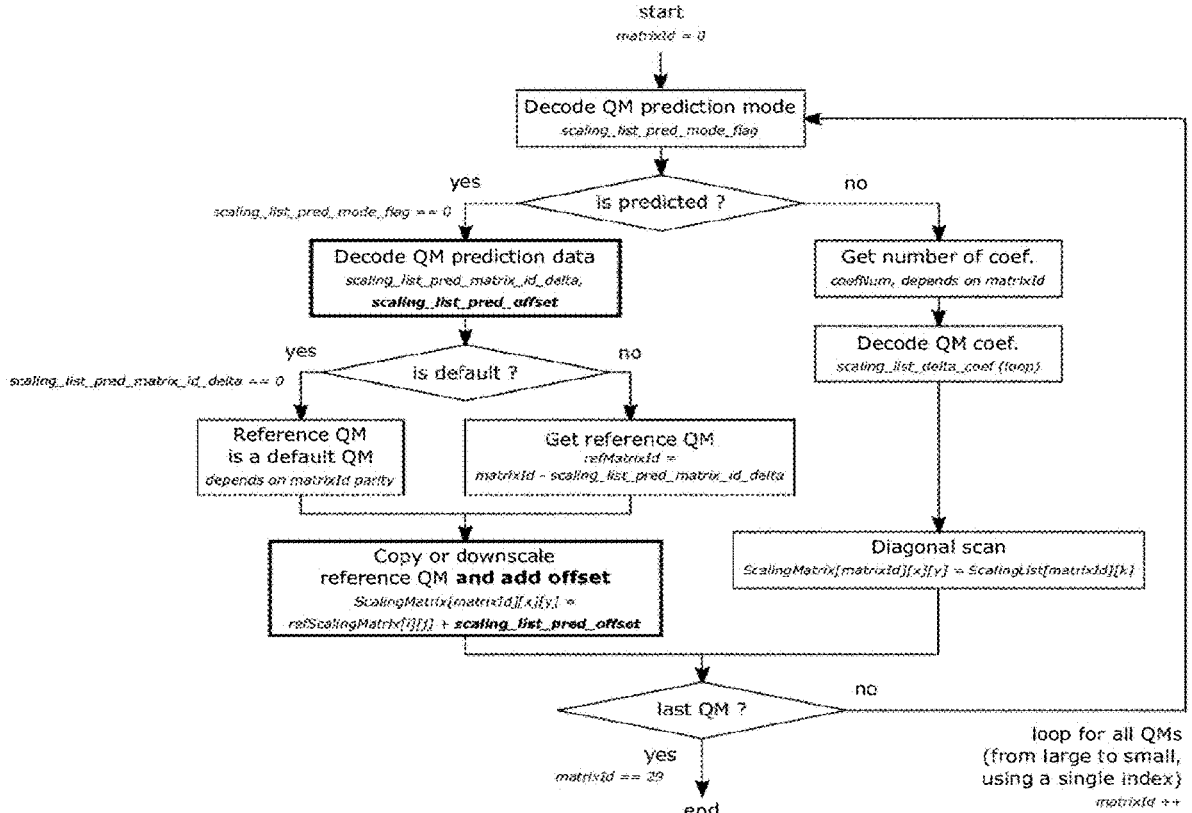
FIG. 5 illustrates an example of an embodiment of a modified QM decoding workflow.

An example of a modified QM decoding workflow corresponding to the described embodiment above is shown in FIG. 5 wherein changes from JVET-00223 are in bold face text and thick contour.

Alternatively, a global offset can be specified as the first coefficient of a DPCM-coded residual (described below).

In general, at least one example of an embodiment comprises adding a residual to prediction. For example, it can be desirable to transmit a residual on top of QM prediction to refine prediction or to provide an optimized coding scheme for QMs (prediction plus residual instead of direct coding). The syntax used to transmit QM coefficients when not predicted can be reused to transmit a residual when QM is predicted.

In addition, the number of coefficients of the residual can be variable. When these coefficients are DPCM-coded as in HEVC, VVC, and JVET-00223, and the missing coefficients are inferred to be zero, this means the trailing coefficients of the residual are repetitions of the last transmitted residual coefficient. Transmitting a single residual coefficient is then equivalent to applying a constant offset to the whole QM.

In general, at least one variant of the described embodiment comprising adding a residual can further include using a flag when in prediction mode to indicate that coefficients can still be transmitted as with non-prediction mode but interpreted as residuals. When not in prediction mode, to unify the design, coefficients can still be interpreted as residuals on top of a default all-8 QM prediction (the value 8 is to mimic HEVC and VVC behavior but is not limited to that value). An example of syntax and semantics based on JVET-00223 is illustrated below.

| | Descriptor |
|---|---|
| scaling_list_data( ) { | |
|   for( matrixId = 0; matrixId <30; matrixId++ ) { | |
|     scaling_list_pred_mode_flag[ matrixId ] | u(1) |
|     if ( ! scaling_list_pred_mode_flag[ matrixId ] ) <u>{</u> | |
|         scaling_list_pred_matrix_id_delta[ matrixId ] | ue(v) |
|         <u>scaling_list_coef_present_flag</u> | <u>u(1)</u> |
|     <u>}</u> | |
|     <u>if ( scaling_list_coef_present_flag ) {</u> | |
|         nextCoef = <u>0</u> | |
|         coefNum = (matrixId < 20) ? 64 : (matrixId < 26) ? 16 : 4 | |
|         if ( matrixId < 14 ) { | |
|             scaling_list_dc_coef ~~minus8~~[ matrixId ] | se(v) |
|             nextCoef = scaling_list_dc_coef ~~minus8~~[ matrixId ] ~~+ 8~~ | |
|         } | |
|         for( i = 0; i < coefNum; i++ ) { | |
|             scaling_list_delta_coef | se(v) |
|             nextCoef = (nextCoef + scaling_list_delta_coef + 256 ) % 256 | |
|             ScalingList[ matrixId ][ i ] = nextCoef | |
|         } | |
|     } | |
|   } | |
| } | | scaling_list_pred_mode_flag [matrixId] equal to 0 specifies that the scaling matrix is derived from the values of a reference scaling matrix. The reference scaling matrix is specified by scaling_list_pred_matrix_id_delta [matrixId]. scaling_list_pred_mode_flag [matrixId] equal to 1 specifies that the values of the scaling list are explicitly signalled.

When scaling list pred_mode flag [matrixId] is equal to 1, all values of the (matrixSize)×(matrixSize) array predScalingMatrix [matrixId] and the value of the variable predScalingDC [matrixId] are inferred to be equal to 8.

scaling_list_pred_matrix_id_delta [matrixId] specifies the reference scaling matrix used to derive the predicted scaling matrix, as follows. The value of scaling_list_pred_matrix_id_delta [matrixId] shall be in the range of 0 to matrixId, inclusive.

When scaling_list_pred_mode_flag [matrixId] is equal to zero:

The variable refMatrixSize and the array refScalingMatrix are first derived as follows:

If scaling_list_pred_matrix_id_delta [matrixId] is equal to zero, the following applies to set default values:

refMatrixSize is set equal to 8, if matrixId is an even number,

```
refScalingMatrix =                                     (6-1)
{
    { 16, 16, 16, 16, 16, 16, 16, 16 } // placeholder for INTRA default
    values
    { 16, 16, 16, 16, 16, 16, 16, 16 }
    { 16, 16, 16, 16, 16, 16, 16, 16 }
    { 16, 16, 16, 16, 16, 16, 16, 16 }
    { 16, 16, 16, 16, 16, 16, 16, 16 }
    { 16, 16, 16, 16, 16, 16, 16, 16 }
    { 16, 16, 16, 16, 16, 16, 16, 16 }
    { 16, 16, 16, 16, 16, 16, 16, 16 }
},
otherwise
    refScalingMatrix =                                 (6-2)
    {
    { 16, 16, 16, 16, 16, 16, 16, 16 } // placeholder for INTER default
    values
    { 16, 16, 16, 16, 16, 16, 16, 16 }
    { 16, 16, 16, 16, 16, 16, 16, 16 }
    { 16, 16, 16, 16, 16, 16, 16, 16 }
    { 16, 16, 16, 16, 16, 16, 16, 16 }
    { 16, 16, 16, 16, 16, 16, 16, 16 }
    { 16, 16, 16, 16, 16, 16, 16, 16 }
    { 16, 16, 16, 16, 16, 16, 16, 16 }
},
``` otherwise (if scaling_list_pred_matrix_id_delta [matrixId] is greater than zero), the following applies:

```
refMatrixId=matrixId−scaling_list_pred_
    matrix_id_delta[matrixId]                          (6-3)

refMatrixSize=(refMatrixId<20)? 8:(refMa-
    trixId<26)? 4:2)                                   (6-4)

refScalingMatrix=ScalingMatrix [refMatrixId]           (6-5)
```

The array predScalingMatrix [matrixId] is then derived as follows:

```
predScalingMatrix[matrixId][x][y]=refScalingMatrix
    [i][j]

with matrixSize=(matrixId<20)? 8: (matrixId<26)?
    4:2)                                               (6-6)
``` x=0 . . . matrixSize−1, y=0 . . . matrixSize−1, i=x<<(log2(refMatrixSize)−log2(matrixSize)), and j=y<<(log2(refMatrixSize)−log2(matrixSize))

When matrixId is lower than 14, if scaling_list_pred_matrix_id_delta [matrixId] is equal to zero, the variable predScalingDC [matrixId] is set equal to 16, otherwise it is set equal to ScalingDC [refMatrixId].

scaling_list_coef_present_flag equal to 1 specifies that scaling list coefficients are transmitted, and interpreted as a residual to be added to predicted quantization matrix. scaling_list_coef_present_flag equal to 0 specifies that no residual is added. When not present, scaling_list_coef_present_flag is inferred to be equal to 1.

scaling_list_dc_coef ~~minus8~~ [matrixId] ~~plus 8~~ is used to derive ScalingDC [matrixId], which specifies the first value of the scaling matrix when relevant, as described in clause xxx. The value of scaling_list_dc_coef ~~_minus8~~ [matrixId] shall be in the range of −128 to 127, inclusive. When not present, the value of scaling_list_dc_coef [matrixId] is inferred to be equal to 0.When matrixId is lower than 14, the variable ScalingDC [matrixId] is derived as follows:

```
ScalingDC [matrixId] = (predScalingDC [
    matrixId]+scaling_list_dc_coef[matrixId]+
    256)% 256                                          (6-7)
```

~~When scaling_list_pred_mode_flag[ matrixId ] is equal to zero, scaling_list_pred_matrix_id_delta [ matrixId ] is greater than zero, and refMatrixId < 14, then the following applies:~~

~~if matrixId < 14, scaling_list_ dc_coef_minus8[ matrixId ] is inferred to be equal to scaling_list_dc_coef_minus8[ refMatrixId ],~~

~~otherwise, ScalingMatrix[ matrixId ][ 0 ] [ 0 ] is set equal to scaling_list_ dc_coef_minus8[ refMatrixId ] +8~~

~~When scaling_list_pred_mode_flag [ matrixId ] is equal to zero, scaling_list_pred_matrix_id_delta [ matrixId ] is equal to zero (indicating default values), and matrixId < 14, then scaling_list_dc_coef_minus8[ matrixId ] is inferred to be equal to 8~~ scaling_list_delta_coef specifies the difference between the current matrix coefficient ScalingList[matrixId][i] and the previous matrix coefficient ScalingList[matrixId][i−1], when scaling list coef present flag ~~scaling_list_pred_mode_flag[ matrixId ]~~ is equal to 1. The value of scaling_list_delta_coef shall be in the range of −128 to 127, inclusive. ~~The value of ScalingList[ matrixId ][ i ] shall be greater than 0.~~

When scaling list coef present flag is equal to 0, all values of the array ScalingList [matrixId] are inferred to be equal to zero.

The (matrixSize)×(matrixSize) array ScalingMatrix[matrixId] is derived as follows:

$$\text{ScalingMatrix}[\,i\,][\,j\,] = \qquad\qquad (6\text{–}8)$$

$$(\,pred\text{ScalingMatrix}[\,i\,][\,j\,]+\text{ScalingList}[\,\text{matrixId}\,][\,k\,]+256\,)\ \%\ 256$$

with k=0 . . . coefNum−1,
i=diagScanOrder[log2 (coefNum)/2][log2 (coefNum)/2][k][0], and
j=diagScanOrder[log2 (coefNum)/2][log2 (coefNum)/2][k][1]

Further, in "Scaling matrix derivation process" section, the text is changed as follows:

If matrixId is lower than 14, m [0][0] is further modified as follows:

$$\text{m }[0][0]=\text{ScalingDC }[\text{matrixId}]$$

$$[\cancel{\text{scaling\_list\_dc\_coef\_}}$$

$$\cancel{\text{minus8}[\text{matrixId}]+8} \qquad\qquad (6\text{-}9)$$

Figure 6:
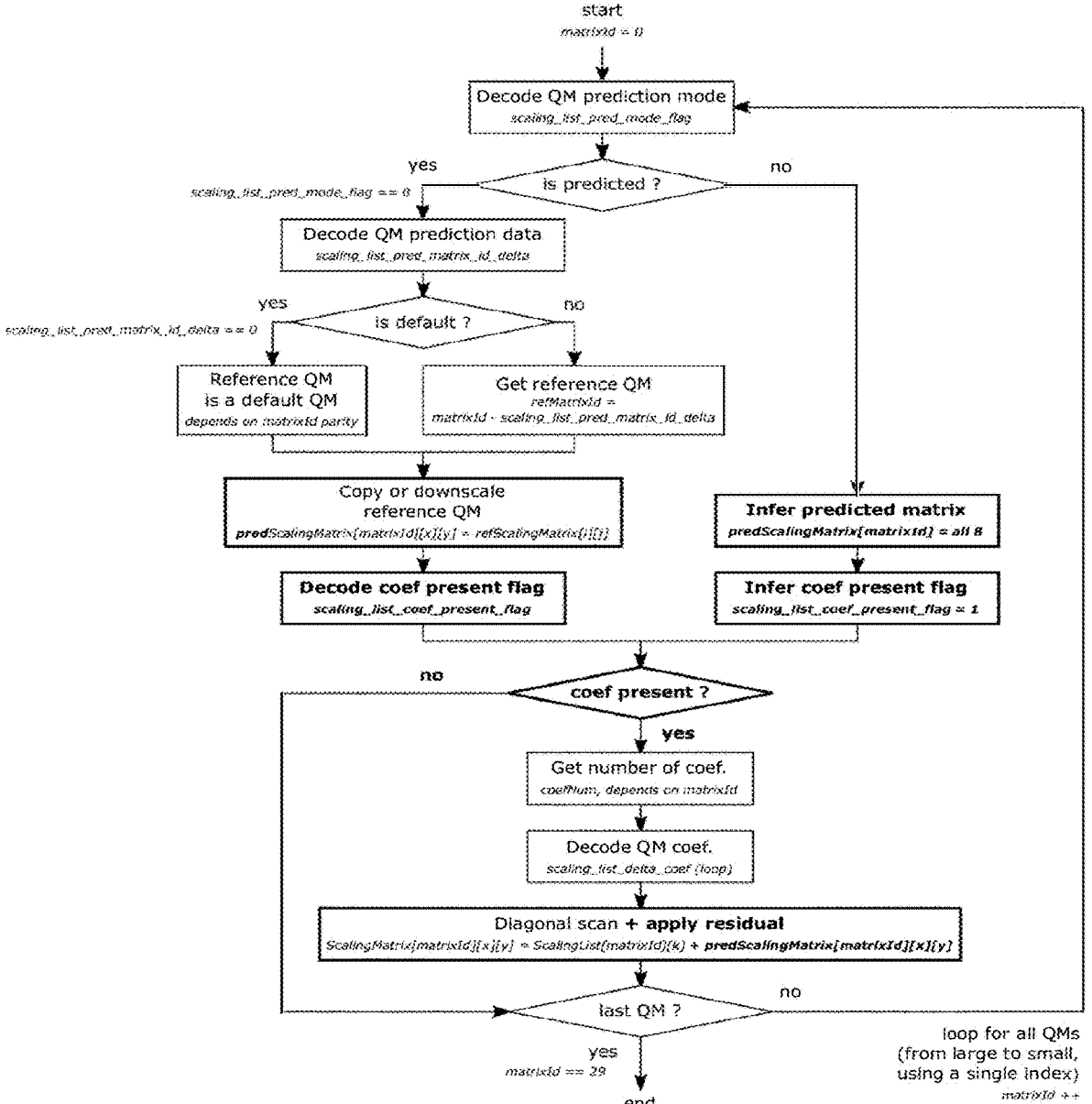
FIG. 6 illustrates another example of an embodiment of a modified QM decoding workflow.

An example of a modified QM decoding workflow corresponding to the preceding embodiment is shown in FIG. 6 wherein changes from JVET-O0223 are in bold face text and thick contour.

In general, at least one example of an embodiment can comprise using a variable-length residual on top of prediction. A variable-length residual can be useful because, for example:

low-frequency coefficients, which are transmitted first because of diagonal scan, have the greatest impact, as coefficients are DPCM-coded, if missing delta-coefficients are inferred to zero, this results in the last residual coefficient being repeated. This means the last residual transmitted is reused for the part of the QM where no residual is transmitted. This way, transmitting a single residual coefficient is equivalent to applying an offset to the whole QM, without using a specific additional syntax.

The number of residual coefficients can be indicated by, e.g.:

An explicit number of coefficients with exp-golomb coding or fixed-length coding (with length depending on matrixId), or A flag indicating the presence of a residual, followed by the number of residual coefficients minus 1, which can be restricted to powers of 2, Or equivalently, 1+the log2 of the number of residual coefficients, with zero indicating no residual.

This can be coded as fixed-length (length potentially depending on matrixId) or exp-golomb coding, or An index in a list, where the list contains numbers of coefficients. It is recommended that this list is fixed by the standard (does not need to be transmitted), e.g. {0, 1, 2, 4, 8, 16, 32, 64}.

The number of residual coefficients does not need to count the potential extra DC residual coefficient. This extra DC residual coefficient can be transmitted as soon as at least one regular residual coefficient is to be sent.

An example of syntax and semantics, based on the immediately preceding example embodiment, is provided below.

| | Descriptor |
|---|---|
| scaling_list_data( ) { | |
|   for( matrixId = 0; matrixId < 30; matrixId++ ) { | |
|     matrixSize = (matrixId < 20) ? 8 : (matrixId < 26) ? 4 : 2 | |
|     maxCoefNum = matrixSize * matrixSize | |
|     scaling_list_pred_mode_flag[ matrixId ] | u(1) |
|     if ( !scaling_list_pred_mode_flag[ matrixId ] ) { | |
|       scaling_list_pred_matrix_id_delta[ matrixId ] | ue(v) |
|       coefNum ~~scaling_list_coef_present_flag~~ | ue(v) ~~u(1)~~ |
|     } else | |
|       coefNum = maxCoefNum | |
|     ~~if ( scaling_list_coef_present_flag ) {~~ | |
|     nextCoef = 0 | |
|     if ( matrixId < 14 && coefNum > 0) { | |
|       scaling_list_dc_coef[ matrixId ] | se(v) |
|       nextCoef = scaling_list_dc_coef[ matrixId ] | |
|     } | |
|     for( i = 0; i < maxCoefNum; i++ ) { | |
|       if( i < coefNum ) { | |
|         scaling_list_delta_coef | se(v) |
|         nextCoef = ( nextCoef + scaling_list_delta_coef + 256 ) % 256 | |
|       } | |
|       SealingList[ matrixId ][ i ] = nextCoef | |
|     } | |
|     ~~}~~ | |
|   } | |
| } | | scaling_list_pred_mode_flag [matrixId] equal to 0 specifies that the scaling matrix is derived from the values of a reference scaling matrix. The reference scaling matrix is specified by scaling_list_pred_matrix_id_delta [matrixId]. scaling_list_pred_mode_flag [matrixId] equal to 1 specifies that the values of the scaling list are explicitly signalled.

When scaling_list_pred_mode_flag [matrixId] is equal to 1, all values of the matrixSize×matrixSize array pred-ScalingMatrix [matrixId] and the value of the variable predScalingDC [matrixId] are inferred to be equal to 8.

scaling_list_pred_matrix_id_delta [matrixId] specifies the reference scaling matrix used to derive the predicted scaling matrix, as follows. The value of scaling_list_pred_matrix_id_delta [matrixId] shall be in the range of 0 to matrixId, inclusive.

When scaling_list_pred_mode_flag [matrixId] is equal to zero:

The variable refMatrixSize and the array refScalingMatrix are first derived as follows:

If scaling_list_pred_matrix_id_delta [matrixId] is equal to zero, the following applies to set default values:

refMatrixSize is set equal to 8, if matrixId is an even number, $$
\begin{aligned}
&\text{refScalingMatrix} = && (6\text{-}10) \\
&\{ \\
&\quad \{ 16, 16, 16, 16, 16, 16, 16, 16 \} \text{ // placeholder for INTRA default values} \\
&\quad \{ 16, 16, 16, 16, 16, 16, 16, 16 \} \\
&\quad \{ 16, 16, 16, 16, 16, 16, 16, 16 \} \\
&\quad \{ 16, 16, 16, 16, 16, 16, 16, 16 \} \\
&\quad \{ 16, 16, 16, 16, 16, 16, 16, 16 \} \\
&\quad \{ 16, 16, 16, 16, 16, 16, 16, 16 \} \\
&\quad \{ 16, 16, 16, 16, 16, 16, 16, 16 \} \\
&\quad \{ 16, 16, 16, 16, 16, 16, 16, 16 \} \\
&\}, \\
&\text{otherwise} \\
&\text{refScalingMatrix} = && (6\text{-}11) \\
&\{ \\
&\quad \{ 16, 16, 16, 16, 16, 16, 16, 16 \} \text{ // placeholder for INTER default values} \\
&\quad \{ 16, 16, 16, 16, 16, 16, 16, 16 \} \\
&\quad \{ 16, 16, 16, 16, 16, 16, 16, 16 \} \\
&\quad \{ 16, 16, 16, 16, 16, 16, 16, 16 \} \\
&\quad \{ 16, 16, 16, 16, 16, 16, 16, 16 \} \\
&\quad \{ 16, 16, 16, 16, 16, 16, 16, 16 \} \\
&\quad \{ 16, 16, 16, 16, 16, 16, 16, 16 \} \\
&\quad \{ 16, 16, 16, 16, 16, 16, 16, 16 \} \\
&\},
\end{aligned}
$$

otherwise (if scaling_list_pred_matrix_id_delta [matrixId] is greater than zero), the following applies:

$$\text{refMatrixId} = \text{matrixId-scaling\_list\_pred\_matrix\_id\_delta [matrixId]} \quad (6\text{-}12)$$

$$\text{refMatrixSize} = (\text{refMatrixId}<20)?\ 8:\ (\text{refMatrixId}<26)?4:2) \quad (6\text{-}13)$$

$$\text{refScalingMatrix} = \text{ScalingMatrix [refMatrixId]} \quad (6\text{-}14)$$

The array predScalingMatrix[matrixId] is then derived as follows:

$$\text{predScalingMatrix[matrixId][x][y]} = \text{refScalingMatrix[i][j]} \quad (6\text{-}15)$$

with ~~matrixSize = (matrixId < 20) ? 8 : (matrixId < 26) ? 4 : 2)~~

−x=0 . . . matrixSize−1, y=0 . . . matrixSize−1, $$i=x<<(\log2(\text{refMatrixSize})-\log2(\text{matrixSize})), \text{ and}$$

$$j=y<<(\log2(\text{refMatrixSize})-\log2(\text{matrixSize}))$$

When matrixId<14, if scaling_list_pred_matrix_id_delta [matrixId] is equal to zero, the variable predScalingDC[matrixId] is set equal to 16, otherwise it is set equal to ScalingDC[refMatrixId].

coefNum specifies the number of residual coefficients that are transmitted. The value of coefNum shall be in the range 0 to maxCoefNum, inclusive.

~~scaling_list_coef_present_flag equal to 1 specifies that scaling list coefficients are transmitted, and interpreted as a residual to be added to predicted quantization matrix. scaling_list_coef_present_flag equal to 0 specifies that no residual is added. When not present, scaling_list_coef_present_flag is inferred to be equal to 1.~~ scaling_list_dc_coef [matrixId] is used to derive ScalingDC[matrixId], which specifies the first value of the scaling matrix when relevant, as described in clause xxx. The value of scaling_list_dc_coef [matrixId] shall be in the range of −128 to 127, inclusive. When not present, the value of scaling_list_dc_coef [matrixId] is inferred to be equal to 0.

When matrixId is lower than 14, the variable ScalingDC [matrixId] is derived as follows:

$$\text{ScalingDC [matrixId]} = (\text{predScalingDC [matrixId]} + \text{scaling\_list\_dc\_coef [matrixId]} + 256)\%\ 256 \quad (6\text{-}16)$$

scaling_list_delta_coef specifies the difference between the current matrix coefficient ScalingList [matrixId][i] and the previous matrix coefficient ScalingList [matrixId][i−1], for i between 0 and CoefNum−1, inclusive. For i between CoefNum and maxCoefNum−1 inclusive, scaling list delta coef is inferred to be equal to 0 ~~when scaling_list_coef_present_flag is equal to 1~~. The value of scaling_list_delta_coef shall be in the range of −128 to 127, inclusive.

~~When scaling_list_coef_present_flag is equal to 0, all values of the array ScalingList[ matrixId ] are inferred to be equal to zero.~~

The (matrixSize)×(matrixSize) array ScalingMatrix [matrixId] is derived as follows:

$$
\begin{aligned}
&\text{ScalingMatrix}\,[\,i\,]\,[\,j\,] = && (6\text{-}17) \\
&\quad (\,pred\text{ScalingMatrix}[\,i\,]\,[\,j\,] + \text{ScalingList}[\,\text{matrixId}\,]\,[\,k\,] + 256\,) \\
&\qquad\qquad\qquad\qquad\qquad \%\ 256
\end{aligned}
$$

with k=0 . . . maxCoefNum−1,
i=diagScanOrder [log2(matrixSize))][log2(matrixSize)][k][0], and
j=diagScanOrder [log2(matrixSize)][log2(matrixSize)][k][1]

Figure 7:
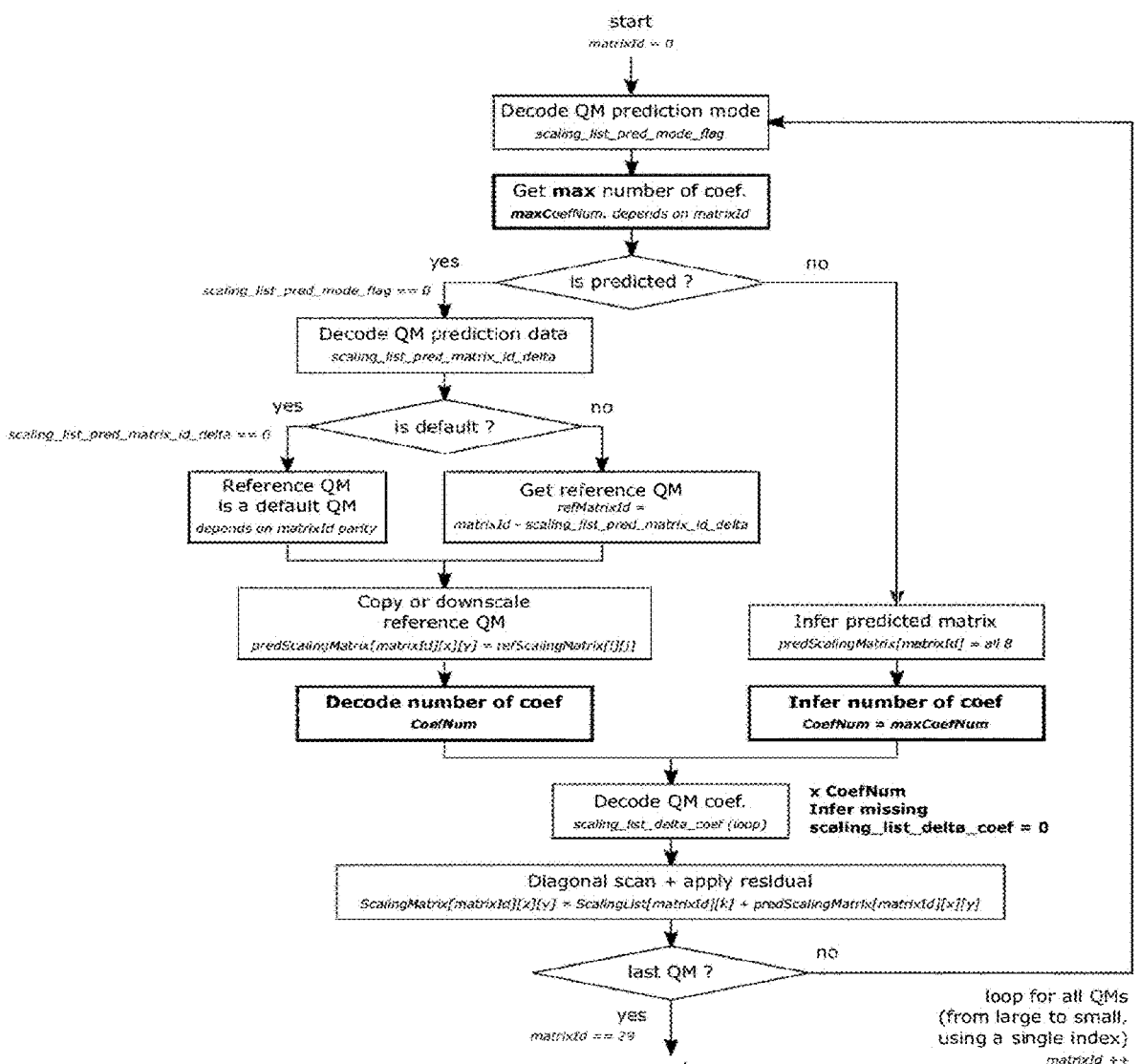
FIG. 7 illustrates another example of an embodiment of a QM decoding workflow involving prediction (e.g., copy) and a variable-length residual.

An example of a modified QM decoding workflow is shown in FIG. 7. The example of an embodiment shown in FIG. 7 involves: prediction=copy; variable-length residual. In FIG. 7, changes from the embodiment example illustrated in FIG. 6 are in bold text and thick contour.

In general, at least one example of an embodiment comprises adding a scale factor to prediction. For example, the prediction of QMs can be enhanced by adding a scale factor to copy/decimation. When combined with the prior embodiment example, this enables two common adjustments made to QMs, scaling and offset, as explained above, and also enables user-defined tradeoff between accuracy and bit cost with a variable-length residual. The scale factor can be an integer, normalized to a number N (e.g. 16). The scaling formula can scale the reference QM around a neutral value of choice (e.g., 16 for HEVC, VVC, or JVET-00223; but that would be zero if QMs are interpreted as QP-offsets). An example formula with $N=(1<<shift)=16$ is shown below:

$$scaledQM = ( ( refQM - 16 ) * scale + rnd ) \gg shift ) + 16 \qquad (6-18)$$

Where:

shift=4 and rnd=8, meaning $N=(1<<4)=16$.

refQM is the input QM to be scaled scale is the scaling factor scaledQM is the output scaled QM The result scaledQM should be further clipped to QM range (e.g. 0 . . . 255 or 1 . . . 255).

The scaling factor scale can be transmitted as an offset to N (in the example above, the transmitted value would be: scale—$(1<<shift)$), so that the value 0 represents a neutral value (no scaling) with minimal bit cost: 1 bit when coded as exp-golomb. Furthermore, the value can be limited to a practical range: for example a number between −32 and 32 meaning a scale between −1 and +3, or a number between −16 and 16 meaning a scale between 0 and +2 (thus limiting scale to positive values).

An example of syntax is shown below. Note that the scale factor is not necessarily combined with an offset or residual; it may be applied alone on top of JVET-00223, VVC, or HEVC.

|  | Descriptor |
| --- | --- |
| scaling_list_data( ) { | |
|   for( matrixId = 0; matrixId < 30; matrixId++ ) { | |
|     matrixSize = (matrixId < 20) ? 8 : (matrixId < 26) ? 4 : 2 | |
|     maxCoefNum = matrixSize * matrixSize | |
|     scaling_list_pred_mode_flag[ matrixId ] | u(1) |
|     if ( !scaling_list_pred_mode_flag[ matrixId ] ) { | |
|       scaling_list_pred_matrix_id_delta[ matrixId ] | ue(v) |
|       scaling_list_pred_scale_minus16[[ matrixId ] | se(v) |
|       coefNum | ue(v) |
|     } else | |
|       coefNum = maxCoefNum | |
|     nextCoef = 0 | |
|     if ( matrixId < 14 && coefNum > 0) { | |
|       scaling_list_dc_coef[ matrixId ] | se(v) |
|       nextCoef = scaling_list_dc_coef[ matrixId ] | |
|     } | |
|     for( i = 0; i < maxCoefNum; i++ ) { | |
|       if( i < coefNum ) { | |
|         scaling_list_delta_coef | se(v) |
|         nextCoef = ( nextCoef + scaling list delta coef + 256 ) % 256 | |
|       } | |
|       ScalingList[ matrixId ][ i ] = nextCoef | |
|     } | |
|   } | |
| } | | scaling_list_pred_mode_flag [matrixId] equal to 0 specifies that the scaling matrix is derived from the values of a reference scaling matrix. The reference scaling matrix is specified by scaling_list_pred_matrix_id_delta [matrixId]. scaling_list_pred_mode_flag [matrixId] equal to 1 specifies that the values of the scaling list are explicitly signalled.

When scaling_list_pred_mode_flag [matrixId] is equal to 1, all values of the matrixSize x matrixSize array predScalingMatrix [matrixId] and the value of the variable predScalingDC [matrixId] are inferred to be equal to 8.

scaling_list_pred_matrix_id_delta [matrixId] specifies the reference scaling matrix used to derive the predicted scaling matrix, ~~as follows~~ follows. The value of scaling_list_pred_matrix_id_delta [matrixId] shall be in the range of 0 to matrixId, inclusive.

scaling list pred scale minus16 [matrixId] plus 16 specifies the scale factor to be applied to the reference scaling matrix used to derive the predicted scaling matrix, as follows. The value of scaling list pred_scale minus16 [matrixId] shall be in the range of −16 to +16, inclusive.

When scaling_list_pred_mode_flag [matrixId] is equal to zero:

The variable refMatrixSize and the array refScalingMatrix are first derived as follows:

If scaling_list_pred_matrix_id_delta [matrixId] is equal to zero, the following applies to set default values:

refMatrixSize is set equal to 8, if matrixId is an even number,

```
refScalingMatrix =                              (6-19)
  {
  { 16, 16, 16, 16, 16, 16, 16, 16 } // placeholder for INTRA default
  values
  { 16, 16, 16, 16, 16, 16, 16, 16 }
  { 16, 16, 16, 16, 16, 16, 16, 16 }
  { 16, 16, 16, 16, 16, 16, 16, 16 }
  { 16, 16, 16, 16, 16, 16, 16, 16 }
  { 16, 16, 16, 16, 16, 16, 16, 16 }
  { 16, 16, 16, 16, 16, 16, 16, 16 }
  { 16, 16, 16, 16, 16, 16, 16, 16 }
  },
otherwise
  refScalingMatrix =                            (6-20)
  {
  { 16, 16, 16, 16, 16, 16, 16, 16 } // placeholder for INTER default
  values
  { 16, 16, 16, 16, 16, 16, 16, 16 }
  { 16, 16, 16, 16, 16, 16, 16, 16 }
  { 16, 16, 16, 16, 16, 16, 16, 16 }
  { 16, 16, 16, 16, 16, 16, 16, 16 }
  { 16, 16, 16, 16, 16, 16, 16, 16 }
  { 16, 16, 16, 16, 16, 16, 16, 16 }
  { 16, 16, 16, 16, 16, 16, 16, 16 }
  },
``` otherwise (if scaling_list_pred_matrix_id_delta [matrixId] is greater than zero), the following applies:

$$refMatrixId = matrixId - scaling\_list\_pred\_matrix\_id\_delta \ [matrixId] \quad (6\text{-}21)$$

$$refMatrixSize = (refMatrixId < 20)? \ 8: (refMatrixId < 26)? \ 4:2) \quad (6\text{-}22)$$

$$refScalingMatrix = ScalingMatrix \ [refMatrixId] \quad (6\text{-}23)$$

The array predScalingMatrix [matrixId] is then derived as follows:

$$pred\text{ScalingMatrix}[\ matrixId\ ][\ x\ ][\ y\ ] = Clip3(\ 1, 255, ((( \quad (6\text{-}24)$$
$$ref\text{ScalingMatrix}[\ i\ ][\ j\ ]\underline{-16}) * scale + 8\ ) \gg 4\ ) + 16\ )$$

with x=0 . . . matrixSize−1, y=0 . . . matrixSize−1, i=x<<(log2 (refMatrixSize)−log2 (matrixSize)), ~~,and~~ j=y<<(log2 (refMatrixSize)−log2 (matrixSize)), and scale =scaling list pred scale minus16 [matrixId]+16

When matrixId<14, if scaling_list_pred_matrix_id_delta [matrixId] is equal to zero, the variable predScalingDC [matrixId] is set equal to 16, otherwise it is ~~set equal to ScalingDC[ refMatrixId ]~~ derived as follows:

$$pred\text{ScalingDC}[\ matrixId\ ] = \quad (6\text{-}25)$$
$$\underline{Clip3(1, 255, ((( \ ScalingDC[\ ref\text{MatrixId}\ ] - 16) *}$$
$$\underline{scale + 8\ ) \gg 4\ ) + 16\ )}$$

with scale=scaling_list_pred_scale_minus 16 [matrixId]+16 coefNum specifies the number of residual coefficients that are transmitted. The value of coefNum shall be in the range 0 to maxCoefNum, inclusive.

scaling_list_dc_coef [matrixId] is used to derive ScalingDC [matrixId], which specifies the first value of the scaling matrix when relevant, as described in clause xxx. The value of scaling_list_dc_coef [matrixId] shall be in the range of −128 to 127, inclusive. When not present, the value of scaling_list_dc_coef [matrixId] is inferred to be equal to 0.

When matrixId is lower than 14, the variable ScalingDC [matrixId] is derived as follows:

$$ScalingDC[\ matrixId\ ] = (\ pred\text{ScalingDC}[\ matrixId\ ] + \quad (6\text{-}26)$$
$$scaling\_list\_dc\_coef[\ matrixId\ ] + 256\ ) \ \% \ 256$$

scaling_list_delta_coef specifies the difference between the current matrix coefficient ScalingList [matrixId][i] and the previous matrix coefficient ScalingList [matrixId][i−1], for i between 0 and CoefNum−1, inclusive. For i between CoefNum and maxCoefNum-1 inclusive, scaling_list_delta_coef is inferred to be equal to 0. The value of scaling_list_delta_coef shall be in the range of −128 to 127, inclusive.

The (matrixSize)×(matrixSize) array ScalingMatrix [matrixId] is derived as follows:

$$ScalingMatrix[\ i\ ][\ j\ ] = \quad (6\text{-}27)$$
$$(\ pred\text{ScalingMatrix}[\ i\ ][\ j\ ] + ScalingList[\ matrixId\ ][\ k\ ] + 256\ )$$
$$\% \ 256$$

with k =0 . . . maxCoefNum-1,
    i=diagScanOrder [log2 (matrixSize)][log2 (matrix-Size)][k][0], and
    j=diagScanOrder [log2 (matrixSize)][log2 (matrix-Size)][k][1]

Figure 8:
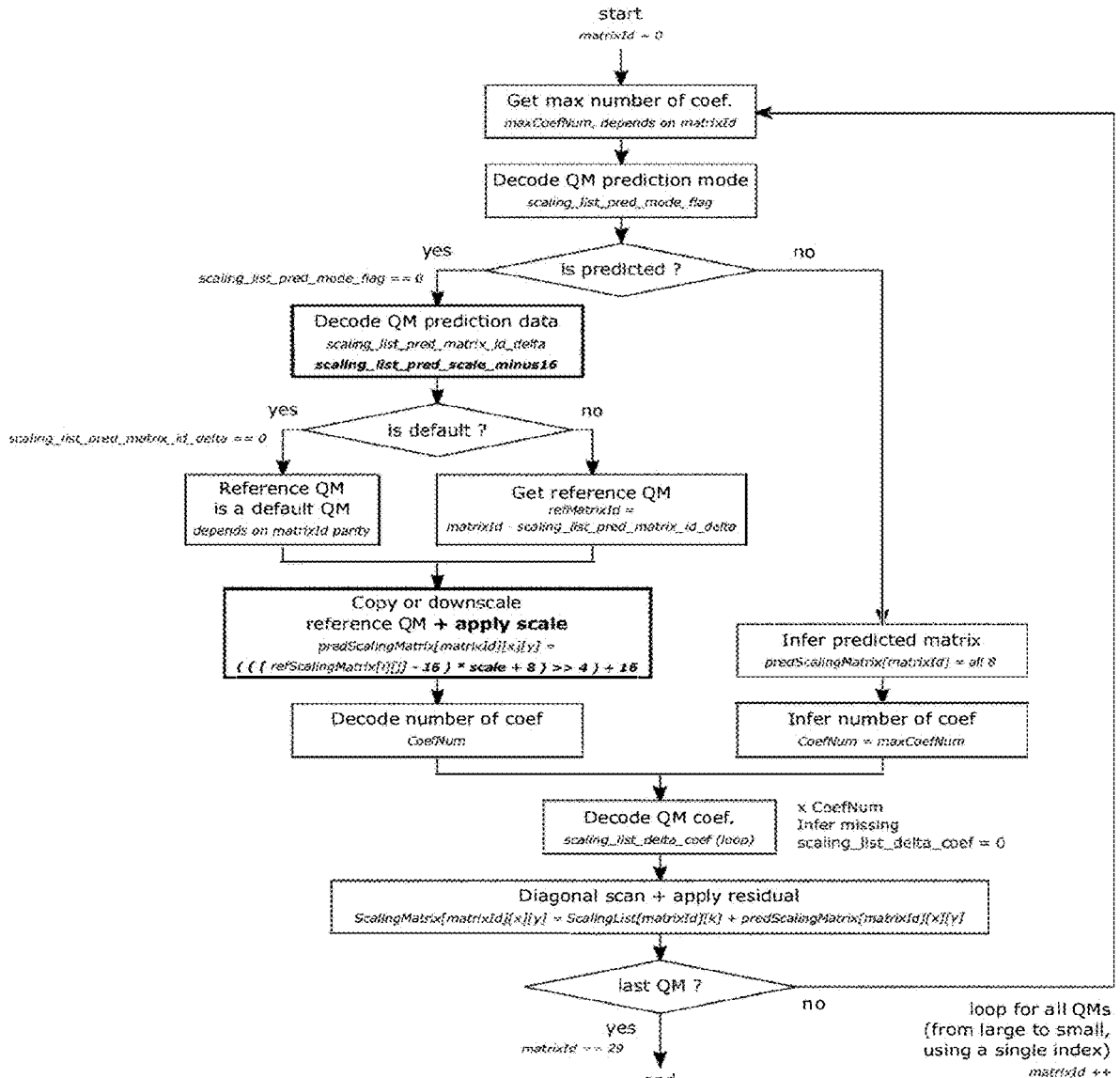
FIG. 8 illustrates another example of an embodiment of a QM decoding workflow involving prediction (e.g., scale) and a variable-length residual.

An example of a modified QM decoding workflow is shown in FIG. 8. The example of an embodiment shown in FIG. 9 involves: prediction=scale; variable-length residual. In FIG. 8, changes from the embodiment example illustrated in FIG. 7 are in bold face text and thick contour.

In general, at least one example of an embodiment comprises removing a prediction mode flag. For example, as long as a full residual can be transmitted such as in examples of embodiments described above, since full specification of QM is possible regardless of the scaling_list_pred_mode_flag flag, this flag can be removed, which simplifies specification text with marginal impact on bit cost.

The following provides an example of syntax and semantics for the current embodiment based on changes to the prior embodiment.

|  | Descriptor |
|---|---|
| scaling_list_data( ) { | |
|   for( matrixId = 0; matrixId < 30; matrixId++ ) { | |
|     matrixSize = (matrixId < 20) ? 8 : (matrixId < 26) ? 4 : 2 | |
|     maxCoefNum = matrixSize * matrixSize | |
|     ~~scaling_list_pred_mode_flag[ matrixId ]~~ | ~~u(1)~~ |
|     ~~if ( !scaling_list_pred_mode_flag[ matrixId ] ) {~~ | |
|     scaling_list_pred_matrix_id_delta[ matrixId ] | ue(v) |
|     scaling_list_pred_scale_minus16[ matrixId ] | se(v) |
|     coefNum | ue(v) |
|     ~~} else~~ | |
|     ~~coefNum = maxCoefNum~~ | |
|     nextCoef = 0 | |
|     if ( matrixId < 14 && coefNum > 0) { | |
|       scaling_list_dc_coef[ matrixId ] | se(v) |
|       nextCoef = scaling_list_dc_coef[ matrixId ] | |
|     } | |
|     for( i = 0; i < maxCoefNum; i++ ) { | |
|       if( i < coefNum ) { | |
|         scaling_list_delta_coef | se(v) |
|         nextCoef = ( nextCoef + | |
|         scaling_list_delta_coef + 256 ) % 256 | |
|       } | |
|       ScalingList[ matrixId ][ i ] = nextCoef | |
|     } | |
|   } | |
| } | |

~~scaling_list_pred_mode_flag[ matrixId ]~~ ~~equal to 0 specifies that~~ ~~the scaling matrix is derived from~~ ~~the values of a reference scaling~~ ~~matrix. The reference matrix. The reference~~ ~~scaling_list_pred_matrix_id_delta~~ ~~[ matrixId ]. scaling_list_pred_~~ ~~mode_flag[ matrixId ] equal to 1~~ ~~specifies that the values of the~~ ~~scaling list are explicitly signalled.~~ ~~When scaling_list_pred_mode_flag~~ ~~[ matrixId ] is equal to 1, all~~ ~~values of the matrixSize x matrixSize~~ ~~array predScalingMatrix[ matrixId ]~~ ~~and the value of the variable pred~~ ~~ScalingDC[ matrixId ] are inferred~~ ~~to be equal to 8.~~ scaling_list_pred_matrix_id_delta [matrixId] specifies the reference scaling matrix used to derive the predicted scaling matrix. The value of scaling_list_pred_matrix_id_delta [matrixId] shall be in the range of 0 to matrixId, inclusive.

scaling_list_pred_scale_minus16 [matrixId] plus 16 specifies the scale factor to be applied to the reference scaling matrix used to derive the predicted scaling matrix, as follows. The value of scaling_list_pred_scale_minus16 [matrixId] shall be in the range of −16 to +16, inclusive.

~~When scaling_list_pred_mode_flag~~

~~[ matrixId ] is equal to zero:~~

The variable refMatrixSize and the array refScalingMatrix are first derived as follows:

If scaling_list_pred_matrix_id_delta [matrixId] is equal to zero, the following applies to set default values:

refMatrixSize is set equal to 8, if matrixId is an even number, refScalingMatrix =                     (6-28)
  {
  { 16, 16, 16, 16, 16, 16, 16, 16 }    // placeholder for INTRA default values
  { 16, 16, 16, 16, 16, 16, 16, 16 }
  { 16, 16, 16, 16, 16, 16, 16, 16 }
  { 16, 16, 16, 16, 16, 16, 16, 16 }
  { 16, 16, 16, 16, 16, 16, 16, 16 }
  { 16, 16, 16, 16, 16, 16, 16, 16 }
  { 16, 16, 16, 16, 16, 16, 16, 16 }
  { 16, 16, 16, 16, 16, 16, 16, 16 }
  },
otherwise
  refScalingMatrix =                  (6-29)
  {
  { 16, 16, 16, 16, 16, 16, 16, 16 }    // placeholder for INTER default values
  { 16, 16, 16, 16, 16, 16, 16, 16 }
  { 16, 16, 16, 16, 16, 16, 16, 16 }
  { 16, 16, 16, 16, 16, 16, 16, 16 }
  { 16, 16, 16, 16, 16, 16, 16, 16 }
  { 16, 16, 16, 16, 16, 16, 16, 16 }
  { 16, 16, 16, 16, 16, 16, 16, 16 }
  { 16, 16, 16, 16, 16, 16, 16, 16 }
  }, otherwise (if scaling_list_pred_matrix_id_delta [matrixId] is greater than zero), the following applies:

refMatrixId=matrixId−scaling_list_pred_matrix_id_delta [matrixId]    (6-30)

refMatrixSize=(refMatrixId<20)? 8: (refMatrixId<26)? 4:2)    (6-31)

refScalingMatrix=ScalingMatrix [refMatrixId]    (6-32)

The array predScalingMatrix [matrixId] is then derived as follows:

$pred$ScalingMatrix[ matrixId ][ $x$ ][ $y$ ] = Clip3    (6−33)

( 1, 255, ( ( ( $ref$ScalingMatrix[ $i$ ][ $j$ ] − 16 ) ∗ scale + 8 ) ≫ 4 ) + 16 )

with x=0 . . . matrixSize−1, y=0 . . . matrixSize−1,
i=x<<(log2 (refMatrixSize)−log2 (matrixSize))
j=y<<(log2 (refMatrixSize)−log2 (matrixSize)), and
scale=scaling_list_pred_scale_minus16 [matrixId]+
16

When matrixId<14, if scaling_list_pred_matrix_id_ _delta [matrixId] is equal to zero, the variable pred-ScalingDC[matrixId] is set equal to 16, otherwise it is derived as follows:

$$pred\text{ScalingDC[ matrixId ]} = \qquad (6\text{--}34)$$

$$\text{Clip3( 1, 255, ( ( ( ScalingDC[ } ref\text{MatrixId ] } - 16 )*$$

$$\text{scale} + 8 ) \gg 4 ) + 16 )$$

with scale = scaling_list_pred_scale_minus16[ matrixId ] + 16 coefNum specifies the number of residual coefficients that are transmitted. The value of coefNum shall be in the range 0 to maxCoefNum, inclusive.

scaling_list_dc_coef [matrixId] is used to derive ScalingDC [matrixId], which specifies the first value of the scaling matrix when relevant, as described in clause xxx. The value of scaling_list_dc_coef [matrixId] shall be in the range of −128 to 127, inclusive. When not present, the value of scaling_list_dc_coef [matrixId] is inferred to be equal to 0.

When matrixId is lower than 14, the variable ScalingDC [matrixId] is derived as follows:

$$\text{ScalingDC[ matrixId ]} = ( pred\text{ScalingDC[ matrixId ]} + \qquad (6\text{--}35)$$

$$\text{scaling\_list\_dc\_coef[ matrixId ]} + 256 ) \% 256$$

scaling_list_delta_coef specifies the difference between the current matrix coefficient ScalingList [matrixId][i] and the previous matrix coefficient ScalingList [matrixId][i−1], for i between 0 and CoefNum−1, inclusive. For i between CoefNum and maxCoefNum−1 inclusive, scaling_list_delta_coef is inferred to be equal to 0. The value of scaling_list_delta_coef shall be in the range of −128 to 127, inclusive.

The (matrixSize)×(matrixSize) array ScalingMatrix [matrixId] is derived as follows:

$$\text{ScalingMatrix [ } i \text{ ][ } j \text{ ]} = \qquad (6\text{--}36)$$

$$( pred\text{ScalingMatrix[ } i \text{ ][ } j \text{ ] } + \text{ScalingList[ matrixId ][ } k \text{ ] } + 256 )$$

$$\% \ 256$$

with k=0 . . . maxCoefNum−1,
i=diagScanOrder [log2 (matrixSize)][log2 (matrix-Size)][k][0], and
j=diagScanOrder [log2 (matrixSize)][log2 (matrix-Size)][k][1]

Figure 9:
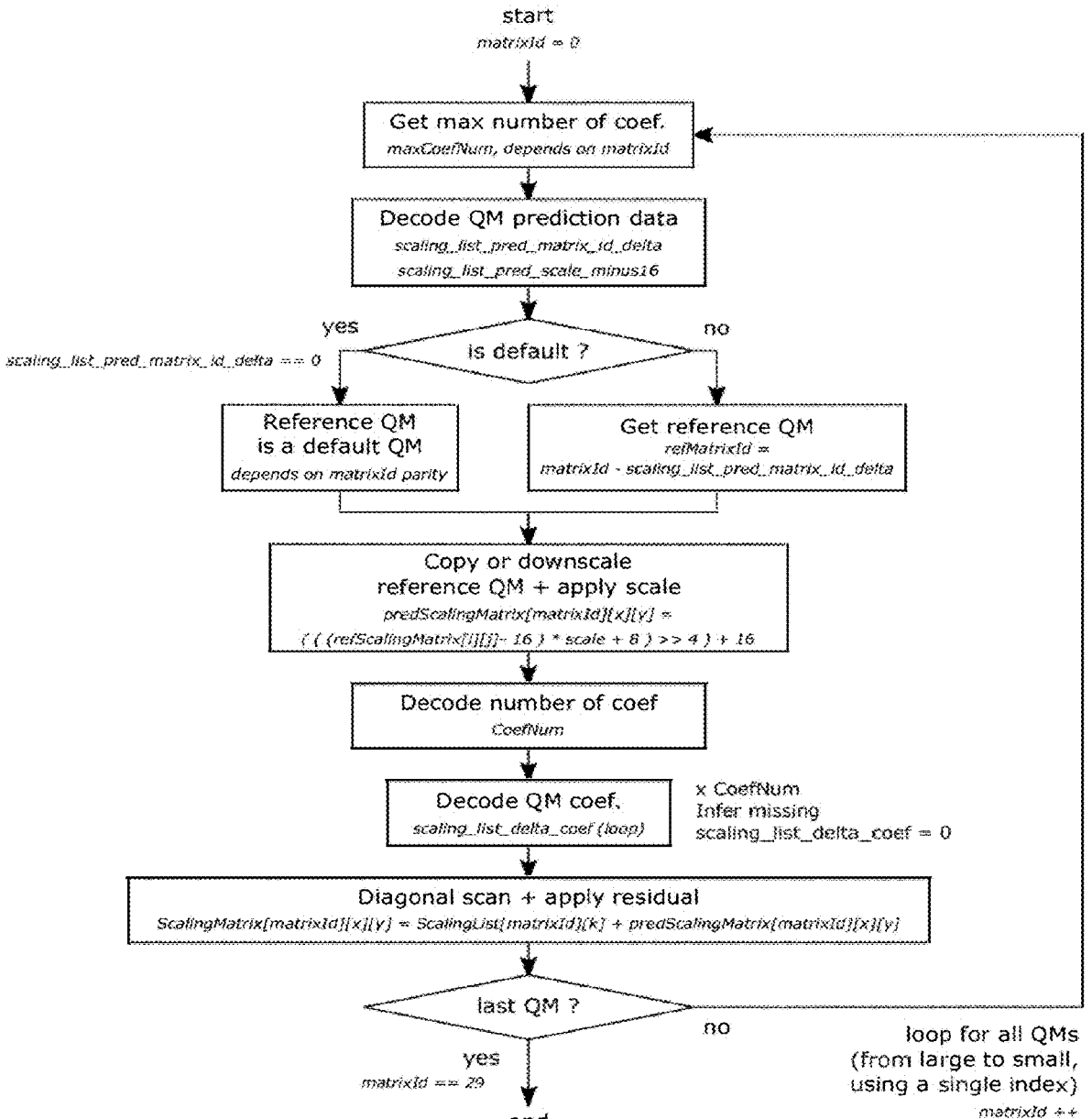
FIG. 9 illustrates another example of an embodiment of a QM decoding workflow involving always using prediction (e.g., scale) and a variable-length residual.

An example of a modified QM decoding workflow is shown in FIG. 9. The example of an embodiment shown in FIG. 9 involves: always use prediction; prediction=scale; variable-length residual. In FIG. 9, changes from the embodiment example illustrated in FIG. 8 comprise deletions of features of FIG. 8.

At least several examples of various other embodiments are described below that involve several contributions submitted for the changes to the 16th JVET meeting that are considering changes to QMs, taking the current VVC technique described above as a reference. Most could consider equivalent changes to the technique proposed in this disclosure without changing its essence, but impacting the example syntax and semantics, by affecting the number of QM, QM identifier mapping, QM matrix size formulas, QM selection and/or resize process.

Examples of embodiments providing adaptations to the changes are detailed in the following subsections.

At least one example of an embodiment can involve removal of some or all 2×2 chroma QMs. VVC recently removed 2×2 chroma transform blocks in intra mode, thus transmitting 2×2 QMs intra QM is made useless, though the waste can be limited to 2×3=6 bits (3 bits are needed to signal use of default matrix with the syntax example described above).

Removing luma 2×2 QMs would affect the number of QMs transmitted, with simple syntax change:

| | Descriptor |
|---|---|
| scaling_list_data( ) { | |
|   for( matrixid = 0; matrixId < 28 ~~30~~ ; matrixId++ ) { | |
| [...] | |

And the identifier mapping would be affected too (ids 26 and 28 from Table 6 become void), which could be reflected by adjusting the matrixId selection formula in "Quantization matrix derivation process" from JVET-O0223 (or the update in JVET-P0110), for example:

matrixId=6*sizeId+matrixTypeId
with log2TuWidth=log2 (blkWidth)+(cldx>0)? log2 (SubWidthC): 0,
log2TuHeight=log2 (blkHeight)+(cldx>0)? log2 (Sub-HeightC): 0,
sizeId=6−max (log2TuWidth, log2TuHeight), and
matrixTypeId=(2*cldx+(predMode==MODE_INTRA? 0:1))
matrixId−=(matrixId>25)? (matrixId>27?:2:1): 0

Removing all 2×2 QMs and disabling QM for 2×2 chroma inter blocks would be even less complex, by reducing the number of QMs to 26, as shown in the table below:

| | Descriptor |
|---|---|
| scaling_list_data( ) { | |
|   for( matrixid = 0; matrixId < 26 ~~30~~ matrixId++ ) { | |
|     matrixSize = (matrixId < 20) ? 8 : ~~(matrixId < 26) ?~~ 4 ~~:2~~ | |
| [...] | |

And not calling the "Derivation process for scaling matrix" in the "Scaling process for transform coefficients" of VVC, but adding that case to the exception list instead:

The intermediate (nTbW)×(nTbH) scaling factors array m is derived as follows:
  If one or more of the following conditions are true, m [x][y] is set equal to 16:
    sps_scaling_list_enabled_flag is equal to 0.
    transform_skip_flag [xTbY][yTbY] is equal to 1.
    both nTbW and nTbH are equal to 2
  Otherwise, m is the output of the derivation process for scaling matrix as specified in clause 8.7.1, invoked with the prediction mode CuPredMode [xTbY][yTbY], the colour component variable cldx, the block width nTbW and the block height nTbH as inputs.

Or alternatively, assign all-16 values to the m[ ] [ ] array within "Derivation process for scaling matrix" when block size is 2×2 or similar condition.

At least one other embodiment involves a larger size for size-64 luma QMs. The matrix size formula can be changed to enable e.g. 16×16 coefficients for size-64 luma QM; an example syntax is shown below:

| | Descriptor |
|---|---|
| scaling_list_data( ) { | |
| for( matrixId = 0; matrixId <30; matrixId++ ) { | |
| matrixSize = (matrixId < 1) ? 16: | |
| (matrixId < 20) ? 8 : (matrixId < 26) ? 4 : 2 | |
| [...] | |

It will be clear to one skilled in the art that refMatrixSize in the example semantics of an embodiment described above follows the same rules and shall be changed accordingly.

At least one other embodiment involves adding joint CbCr QMs. Specific QMs for blocks coded with joint CbCr residuals could be desired. These could be added after regular chroma one, resulting in the new identification mapping table below:

TABLE 7 matrixId mapping with extra joint-CbCr QMs

| | | | | | | | |
|---|---|---|---|---|---|---|---|
| Y | INTRA | 0 | 8 | 16 | 24 | 32 | |
| | INTER | 1 | 9 | 17 | 25 | 33 | |
| Cb | INTRA | 2 | 10 | 18 | 26 | 34 | |
| | INTER | 3 | 11 | 19 | 27 | 35 | |
| Cr | INTRA | 4 | 12 | 20 | 28 | 36 | |
| | INTER | 5 | 13 | 21 | 29 | 37 | |
| CbCr | INTRA | 6 | 14 | 22 | 30 | 38 | |
| | INTER | 7 | 15 | 23 | 31 | 39 | |
| TU size: luma max(width, height) | | 64 | 32 | 16 | 8 | 4 | |
| Block size: max(width, height) | | 64 32 | 16 | 8 | 4 | 2 | |
| Signalled QM size | | 8 × 8 + DC | | 8 × 8 | 4 × 4 | 2 × 2 | |

This affects the number of QMs, matrixSize formula, DC coefficient presence condition (moving from <14 to <18) and matrixId formula in the QM selection process, as show below:

| | Descriptor |
|---|---|
| scaling_list_data( ) { | |
| for( matrixid = 0; matrixId < 40 ; matrixId++ ) { | |
| matrixSize = (matrixId < 26 ? 8 : | |
| (matrixId < 34 ) ? 4 : 2 | |
| [...] | |
| if ( matrixId < 18 && coefNum > 0) { | |
| [...] | | matrixId=8 *sizeId+matrixTypeId with log2TuWidth=log2(blkWidth)+(cldx>0)? log2 (SubWidthC): 0, log2TuHeight=log2(blkHeight)+(cldx>0)? log2 (Sub-HeightC): 0, sizeId=6−max(log2TuWidth, log2TuHeight), and matrixTypeId=(2*cldx+
(predMode==MODE_INTRA? 0:1))

Other related places in semantics are affected (refMatrixSize, etc) with corresponding changes that will be clear to one skilled in the art.

At least one other embodiment involves adding QMs for LNFST. LNFST is a secondary transform used in VVC that changes the spatial frequency meaning of the final transform coefficients, thus affecting the meaning of QM coefficients too. Specific QMs may be desired. As LNFST output is limited to 4×4 and has two alternate transform cores, these QMs could be added as a fake TU size inserted before or after the regular size−4 (keeping QMs ordered by decreasing size), as show in the table below. Since LNFST is for INTRA mode only, the INTRA/INTER lines would be used to differentiate the core transform.

TABLE 6 matrixId mapping with extra QMs for LNFST

| | | | | | | | | |
|---|---|---|---|---|---|---|---|---|
| Y | INTRA | 0 | 6 | 12 | 18 | 24 | 30 | |
| | INTER | 1 | 7 | 13 | 19 | 25 | 31 | |
| Cb | INTRA | 2 | 8 | 14 | 20 | 26 | 32 | |
| | INTER | 3 | 9 | 15 | 21 | 27 | 33 | |
| Cr | INTRA | 4 | 10 | 16 | 22 | 28 | 34 | |
| | INTER | 5 | 11 | 17 | 23 | 29 | 35 | |
| TU size: luma max(width, height) | | 64 | 32 | 16 | 8 | LNFST | 4 | |
| Block size: max(width, height) | | 64 32 | 16 | 8 | 4 | | 4 | 2 |
| Signalled QM size | | 8 × 8 + DC | | 8 × 8 | 4 × 4 | | 2 × 2 | |

The syntax and semantics should be modified accordingly, as in the previous examples, to reflect the new matrixId mapping: number of QMs, matrixSize, DC coefficient condition, etc.

The derivation of matrixId in "Quantization matrix derivation process" to select the right QM should be updated too, either by a tabular description as above, or by altering equations/pseudo-code as in the following example:

```
if (lfnst_idx[ xTbY ][ yTbY ] != 0)
    matrixId = 24 + 2*cIdx + lfnst_idx[ xTbY ][ yTbY ]
else {
    matrixId = [ . . . ]
if (matrixId > 23)
    matrixId += 6
}
```

At least one other embodiment involves handling QMs with LNFST by forcing the use of 4×4 QMs. This can be implemented by forcing specific matrixIds in "Quantization matrix derivation process" in case LNFST is used for the current block, for example:

```
if (lfnst_idx[ xTbY ][ yTbY ] != 0)
    matrixId = 20 + (cIdx == 0) ? 10 : 2*cIdx) + lfnst_idx[ xTbY ][ yTbY ]
else
    matrixId = [ . . . ]
```

This application describes a variety of aspects, including tools, features, embodiments, models, approaches, etc. For example, the various aspects, etc., include, but are not limited to:

saving bits in the transmission of custom QMs, while keeping the specification as simple as possible;

improving QM prediction, so that simple adjustments are possible with low bit cost;

providing a simple way to specify a global offset;

one or more of extending the prediction of QMs by applying a scale factor in addition to copy and down-sampling, providing a simple way to specify a global offset, and allowing refining prediction with a variable-length residual;

combining improved prediction with a residual, to further refine QMs, with potentially lower cost than full coding;

providing for QM prediction with offset in addition to copy/downscale;

providing for QM prediction plus (variable-length) residual;

providing for QM prediction with scale factor in addition to copy/downscale;

providing for QM prediction including a combination of scale factor with either offset or residual;

providing for reducing the number of bits needed to transmit QMs, and allow user-defined trade-off between accuracy and bit cost, while keeping specification simple.

providing for reducing the number of bits needed to transmit QMs, and allow user-defined trade-off between accuracy and bit cost, while keeping specification simple based on including one or more of the following features:

add a residual to QM prediction;

add a scaling factor to QM prediction;

combine residual and scaling;

always use prediction (remove prediction mode flag).

Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 10:
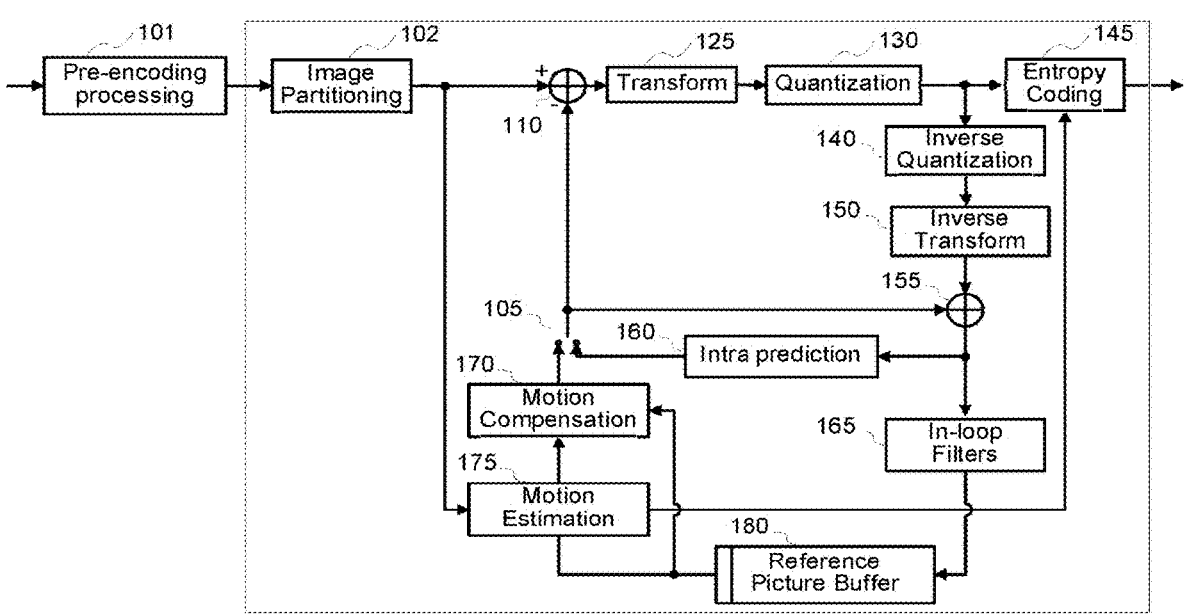
FIG. 10 illustrates, in the form of a block diagram, an example of an embodiment of an encoder, e.g., video encoder, suitable for implementing various aspects, features and embodiments described herein.
Figure 11:
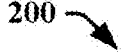
FIG. 11 illustrates, in the form of a block diagram, an example of an embodiment of a decoder, e.g., video decoder, suitable for implementing various aspects, features and embodiments described herein.
Figure 11:
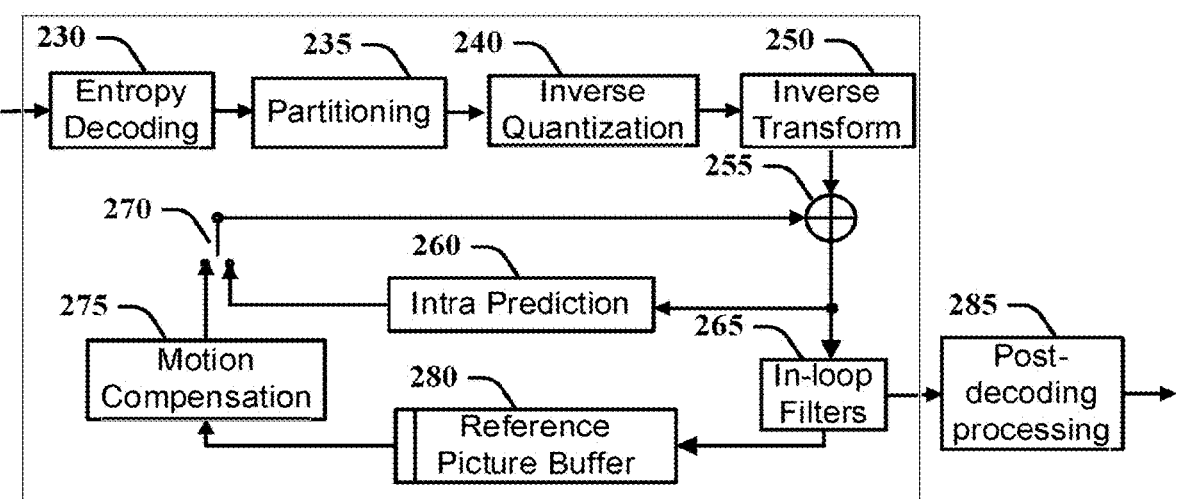
Figure 12:
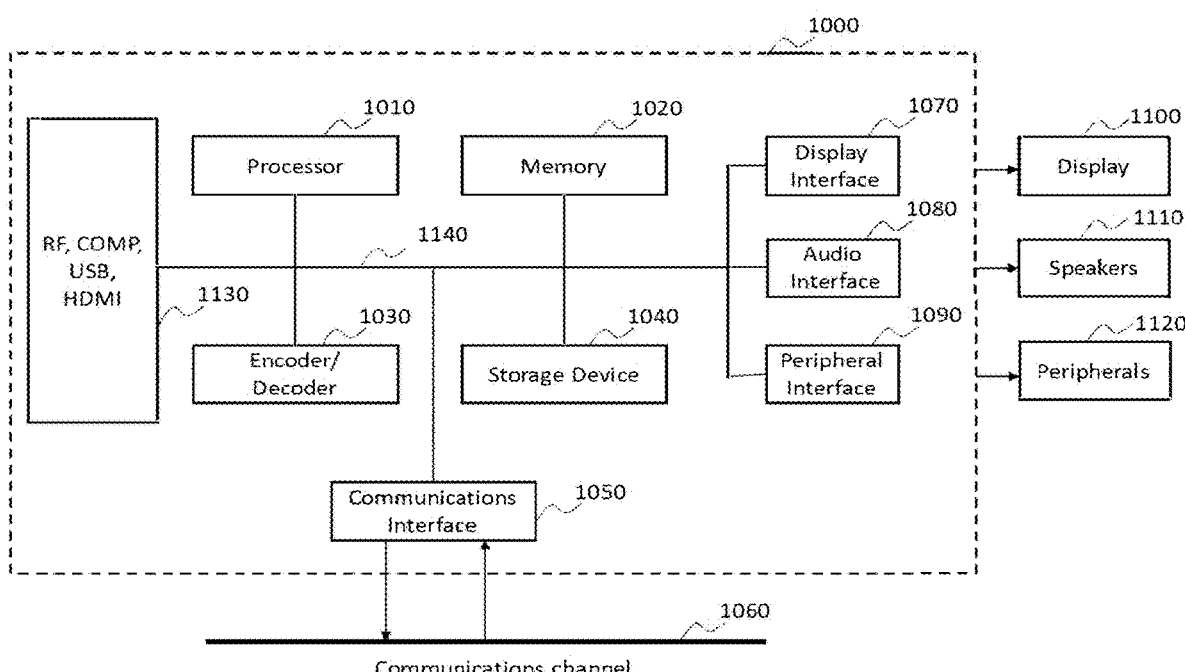
FIG. 12 illustrates, in the form of a block diagram, an example of a system suitable for implementing various aspects, features and embodiments described herein.

The aspects described and contemplated in this application can be implemented in many different forms. FIGS. 10, 11 and 12 below provide some embodiments, but other embodiments are contemplated and the discussion of FIGS. 10, 11 and 12 does not limit the breadth of the implementations.

At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the quantization and inverse quantization modules (130, 140, 240), of a video encoder 100 and decoder 200 as shown in FIG. 10 and FIG. 11. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application, for example, the size of maximum quantization matrix, the number of block sizes considered. The specific values are for example purposes and the aspects described are not limited to these specific values.

FIG. 10 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 11 illustrates a block diagram of a video decoder 200. In the decoder 200, a bitstream is decoded by the decoder elements as described below. Video decoder 200 generally performs a decoding pass reciprocal to the encoding pass as described in FIG. 10. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 12 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 10, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing. Within the integrated housing, the various elements can be interconnected and transmit data therebetween using suitable connection arrangement 1140, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Another example of an embodiment is illustrated in FIG. 13. In FIG. 13, input information such as a bitstream includes encoded video information and other information such as information associated with the encoded video information, e.g., quantization matrix or matrices, and control information such as one or more syntax elements. At 1310, information representing at least one coefficient of a quantization matrix and a syntax element are obtained from the input, e.g., the input bitstream. At 1320, it is determined, based on a syntax element, that the information representing the at least one coefficient is to be interpreted as a residual. Then, at 1330, at least a portion of the encoded video information is decoded based on a combination of a prediction of the quantization matrix and the residual. One or more examples of features shown and described with regard to FIG. 13 were illustrated and described previously herein, e.g., with regard to FIG. 6.

Another example of an embodiment is illustrated in FIG. 14. In FIG. 14, an input including video information is processed at 1410 to obtain video information and information representing at least one coefficient of a predicted quantization matrix associated with at least a portion of the video information. At 1420, it is determined that the at least one coefficient is to be interpreted as a residual. For example, processing of the video information may indicate that use of a residual provides for an advantageous processing of certain video information, e.g., provides for improved compression efficiency when encoding the video information or improved video quality when decoding the encoded video information. Then, at 1430, at least a portion of the video information is encoded based on a combination of the predicted quantization matrix and the residual. The encoding at 1430 also encodes a syntax element indicating the at least one coefficient is to be interpreted as a residual.

Various implementations and examples of embodiments described herein involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, for example, scaling_list_pred_mode_flag, scaling_list_pred_matrix_id-_delta, scaling_list_dc_coef_minus8, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

Various generalized as well as particularized embodiments are also supported and contemplated throughout this disclosure. Examples of embodiments in accordance with the present disclosure include but are not limited to the following.

In general, at least one example of an embodiment can involve a method comprising: obtaining, from a bitstream including encoded video information, information representing at least one coefficient of a quantization matrix and a syntax element; determining, based on the syntax element, that the information representing the at least one coefficient is to be interpreted as a residual; and decoding at least a portion of the encoded video information based on a combination of a prediction of the quantization matrix and the residual.

In general, at least one example of an embodiment can involve apparatus comprising: one or more processors configured to obtain, from a bitstream including encoded video information, information representing at least one coefficient of a quantization matrix and a syntax element; determine, based on the syntax element, that the information representing the at least one coefficient is to be interpreted as a residual; and decode at least a portion of the encoded video information based on a combination of a prediction of the quantization matrix and the residual.

In general, at least one example of an embodiment can involve a method comprising: obtaining video information and information representing at least one coefficient of a predicted quantization matrix associated with at least a portion of the video information; determining that the at least one coefficient is to be interpreted as a residual; and encoding the at least a portion of the video information based on a combination of the predicted quantization matrix and the residual, and encoding a syntax element indicating the at least one coefficient is to be interpreted as a residual.

In general, at least one example of an embodiment can involve apparatus comprising: one or more processors configured to obtain video information and information representing at least one coefficient of a predicted quantization matrix associated with at least a portion of the video information; determine that the at least one coefficient is to be interpreted as a residual; and encode the at least a portion of the video information based on a combination of the predicted quantization matrix and the residual, and encoding a syntax element indicating the at least one coefficient is to be interpreted as a residual.

In general, at least one example of an embodiment can involve a method or apparatus including a residual as described herein, wherein the residual comprises a variable length residual.

In general, at least one example of an embodiment can involve a method or apparatus as described herein, wherein at least one coefficient comprises a plurality of predicted quantization matrix coefficients and a combination comprises adding the residual to the plurality of predicted quantization matrix coefficients.

In general, at least one example of an embodiment can involve a method or apparatus as described herein, wherein a combination further comprises applying a scale factor.

In general, at least one example of an embodiment can involve a method or apparatus as described herein, wherein a combination comprises applying a scale factor to a plurality of predicted quantization matrix coefficients and then adding a residual.

In general, at least one example of an embodiment can involve a method or apparatus as described herein, wherein a combination further comprises applying an offset.

In general, at least one example of an embodiment can involve a method or apparatus as described herein, wherein a bitstream includes one or more syntax elements used to transmit the at least one coefficient when the quantization matrix is not predicted that can be reused to transmit the residual when the quantization matrix is predicted.

In general, at least one example of an embodiment can involve a method or apparatus as described herein, producing a bitstream including one or more syntax elements used to transmit the at least one coefficient when the quantization matrix is not predicted that can be reused to transmit the residual when the quantization matrix is predicted.

In general, one or more other examples of embodiments can also provide a computer readable storage medium, e.g., a non-volatile computer readable storage medium, having stored thereon instructions for encoding or decoding picture information such as video data according to the methods or the apparatus described herein. One or more embodiments can also provide a computer readable storage medium having stored thereon a bitstream generated according to methods or apparatus described herein. One or more embodiments can also provide methods and apparatus for transmitting or receiving the bitstream generated according to methods or apparatus described herein.

In general, another example of an embodiment can comprise a signal including data generated according to any of the methods described herein.

In general, another example of an embodiment can involve a signal or bitstream as described herein and comprising at least one syntax element used to represent the at least one coefficient of the quantization matrix when the quantization matrix is not predicted, and wherein the at least one syntax element is used to represent the residual when the quantization matrix is predicted.

In general, another example of an embodiment can comprise a device including an apparatus according to any example of an embodiment described herein, and at least one of (i) an antenna configured to receive a signal, the signal including data representative of the image information, (ii) a band limiter configured to limit the received signal to a band of frequencies that includes the data representative of the image information, and (iii) a display configured to display an image from the image information.

In general, another example of an embodiment can involve a device as described herein and comprising one of a television, a television signal receiver, a set-top box, a gateway device, a mobile device, a cell phone, a tablet, or other electronic device.

Various embodiments are described herein. Features of these embodiments can be provided alone or in any combination, across various claim categories and types. Further, embodiments can include one or more of the following features, devices, or aspects, alone or in any combination, across various claim categories and types:

providing for video encoding and/or decoding comprising saving bits in the transmission of custom QMs, while keeping the specification as simple as possible;

providing for video encoding and/or decoding comprising improving QM prediction, so that simple adjustments are possible with low bit cost;

providing for video encoding and/or decoding comprising a simple way to specify a global offset;

providing for video encoding and/or decoding comprising one or more of extending the prediction of QMs by applying a scale factor in addition to copy and downsampling, providing a simple way to specify a global offset, and allowing refining prediction with a variable-length residual;

providing for video encoding and/or decoding comprising combining improved prediction with a residual, to further refine QMs, with potentially lower cost than full coding;

providing for video encoding and/or decoding comprising QM prediction with offset in addition to copy/downscale;

providing for video encoding and/or decoding comprising QM prediction plus (variable-length) residual;

providing for video encoding and/or decoding comprising QM prediction with scale factor in addition to copy/downscale;

providing for video encoding and/or decoding comprising QM prediction including a combination of scale factor with either offset or residual;

providing for video encoding and/or decoding comprising reducing the number of bits needed to transmit QMs, and allow user-defined trade-off between accuracy and bit cost, while keeping specification simple;

providing for video encoding and/or decoding comprising reducing the number of bits needed to transmit QMs, and allow user-defined trade-off between accuracy and bit cost, while keeping specification simple based on including one or more of the following features:

add a residual to QM prediction;

add a scaling factor to QM prediction;

combine residual and scaling;

always use prediction (remove prediction mode flag);

providing for video encoding and/or decoding comprising a modification on top of copy for QM prediction including adding a global offset, wherein a global offset can be specified explicitly;

providing for video encoding and/or decoding comprising a global offset that can be specified as the first coefficient of a DPCM-coded residual;

providing for video encoding and/or decoding comprising adding a residual to prediction;

providing for video encoding and/or decoding comprising including a residual on top of QM prediction to refine prediction or to provide an optimized coding scheme for QMs (prediction plus residual instead of direct coding);

providing for video encoding and/or decoding comprising the syntax used to transmit QM coefficients when not predicted can be reused to transmit a residual when QM is predicted;

providing for video encoding and/or decoding comprising adding a residual, wherein the number of coefficients of the residual can be variable;

providing for video encoding and/or decoding comprising adding a residual, wherein adding the residual can involve using a flag when in prediction mode to indicate that coefficients can still be transmitted as with non-prediction mode but interpreted as residuals;

providing for video encoding and/or decoding comprising when not in prediction mode coefficients can still be interpreted as residuals on top of a default QM prediction;

providing for video encoding and/or decoding comprising using a variable-length residual on top of prediction;

providing for video encoding and/or decoding comprising using a variable-length residual on top of prediction, wherein a number of residual coefficients can be indicated by one or more of an explicit number of coefficients; or a flag indicating the presence of a residual followed by the number of residual coefficients minus 1 which can be restricted to powers of 2; or 1+the log2 of the number of residual coefficients, with zero indicating no residual, wherein this can be coded as fixed-length (length potentially depending on matrixId) or exp-golomb coding; or an index in a list, where the list contains numbers of coefficients, e.g., this list can be fixed by a standard and does not need to be transmitted, such as {0, 1, 2, 4, 8, 16, 32, 64}; or the number of residual coefficients does not need to count the potential extra DC residual coefficient which can be transmitted as soon as at least one regular residual coefficient is to be sent;

providing for video encoding and/or decoding comprising adding a scale factor to prediction, e.g., adding a scale factor to copy/decimation;

providing for video encoding and/or decoding comprising QM prediction including a variable-length residual and a scale factor, thereby enabling adjustment to QMs based on scaling and/or offset, and enabling user-defined tradeoff between accuracy and bit cost based on the variable-length residual;

providing for video encoding and/or decoding comprising QM prediction including a variable-length residual and a scale factor, thereby enabling adjustment to QMs based on scaling and/or offset, and enabling user-defined tradeoff between accuracy and bit cost based on the variable-length residual, wherein the scale factor can be an integer, normalized to a number N (e.g., 16), and wherein a scaling formula scales the reference QM around a neutral value;

providing for video encoding and/or decoding comprising adding a scale factor to prediction, wherein the scale factor can be an integer, normalized to a number N, and wherein the scale factor can be transmitted as an offset to N;

providing for video encoding and/or decoding comprising removing a prediction mode flag;

a bitstream or signal that includes one or more of the described syntax elements, or variations thereof;

a bitstream or signal that includes syntax conveying information generated according to any of the embodiments described;

inserting in the signaling syntax elements that enable the decoder to operate in a manner corresponding to that used by an encoder;

creating and/or transmitting and/or receiving and/or decoding a bitstream or signal that includes one or more of the described syntax elements, or variations thereof;

creating and/or transmitting and/or receiving and/or decoding according to any of the embodiments described;

a method, process, apparatus, medium storing instructions, medium storing data, or signal according to any of the embodiments described;

a TV, set-top box, cell phone, tablet, or other electronic device that provides for implementing any of the embodiments described;

a TV, set-top box, cell phone, tablet, or other electronic device that provides for implementing any of the embodiments described, and that displays (e.g. using a monitor, screen, or other type of display) a resulting image;

a TV, set-top box, cell phone, tablet, or other electronic device that selects (e.g. using a tuner) a channel to receive a signal including an encoded image, and that provides for implementing any of the embodiments described;

a TV, set-top box, cell phone, tablet, or other electronic device that receives (e.g. using an antenna) a signal over the air that includes an encoded image, and provides for implementing any of the embodiments described.

The invention claimed is:

1. A method comprising:

obtaining, from a bitstream including encoded video information, a syntax element specifying that information representing at least one coefficient of a quantization matrix is transmitted;

obtaining from the bitstream, the information representing the at least one coefficient of the quantization matrix based on the syntax element;

determining that the quantization matrix is signaled using a prediction mode, wherein the quantization matrix is predicted from a reference quantization matrix;

responsive to determining that the quantization matrix is signaled using the prediction mode, interpreting the information representing the at least one coefficient of the quantization matrix as a residual between the quantization matrix and the reference quantization matrix, wherein one or more syntax elements used to transmit the information representing the at least one coefficient of the quantization matrix when the quantization matrix is signaled using the prediction mode are the same as the one or more syntax elements used to transmit the information representing the at least one coefficient of the quantization matrix when the quantization matrix is not signaled using the prediction mode; and decoding at least a portion of the encoded video information based on the reference quantization matrix and the information representing the at least one coefficient.

2. The method of claim 1, comprising decoding an index specifying the reference quantization matrix.

3. The method of claim 2, wherein the quantization matrix is determined to be signaled using the prediction mode based on a value of a flag indicating that the quantization matrix is derived from coefficients of the reference quantization matrix and on a value of the decoded index being greater than 0.

4. The method of claim 1, wherein the reference quantization matrix is a previously reconstructed quantization matrix.

5. The method of claim 1, wherein a number of residual coefficients is signaled in the bitstream.

6. The method of claim 1, wherein the quantization matrix is obtained from the reference quantization matrix and the information representing the at least one coefficient by obtaining a plurality of predicted quantization matrix coefficients from the reference quantization matrix and adding the residual to the plurality of predicted quantization matrix coefficients.

7. The method of claim 6, wherein the quantization matrix is obtained from the reference quantization matrix and the information representing the at least one coefficient by scaling the reference quantization matrix by a scale factor.

8. The method of claim 1, wherein the quantization matrix is obtained from the reference quantization matrix and the information representing the at least one coefficient by adding an offset to the reference quantization matrix.

9. A non-transitory computer readable medium storing executable program instructions to cause a computer executing the instructions to perform the method according to claim 1.

10. An apparatus comprising:

one or more processors configured to:

obtain, from a bitstream including encoded video information, a syntax element specifying that information representing at least one coefficient of a quantization matrix is transmitted;

obtain from the bitstream, the information representing the at least one coefficient of the quantization matrix based on the syntax element;

determine that the quantization matrix is signaled using a prediction mode wherein the quantization matrix is predicted from a reference quantization matrix;

responsive to determining that the quantization matrix is signaled using the prediction mode, interpret the information representing the at least one coefficient of the quantization matrix as a residual between the quantization matrix and the reference quantization matrix, wherein one or more syntax elements used to transmit the information representing the at least one coefficient of the quantization matrix when the quantization matrix is signaled using the prediction mode are the same as the one or more syntax elements used to transmit the information representing the at least one coefficient of the quantization matrix when the quantization matrix is not signaled using the prediction mode; and decode at least a portion of the encoded video information based on the reference quantization matrix and the information representing the at least one coefficient.

11. The apparatus of claim 10, further comprising at least one of (i) an antenna configured to receive a signal, the signal including data representative of the video information, (ii) a band limiter configured to limit the received signal to a band of frequencies that includes the data representative of the video information, and (iii) a display configured to display a video from the video information.

12. A method comprising:

obtaining video information and information representing at least one coefficient of a quantization matrix associated with at least a portion of the video information;

signaling, in a bitstream, that the quantization matrix is signaled using a prediction mode wherein the quantization matrix is predicted from a reference quantization matrix;

responsive to determining that the quantization matrix is signaled using the prediction mode, interpreting the information representing the at least one coefficient of the quantization matrix as a residual between the quantization matrix and the reference quantization matrix;

signaling, in the bitstream, a syntax element specifying that the information representing the at least one coefficient of the quantization matrix is transmitted;

signaling in the bitstream, the information representing the at least one coefficient of the quantization matrix based on the syntax element, wherein one or more syntax elements used to transmit the information representing the at least one coefficient of the quantization matrix when the quantization matrix is signaled using the prediction mode are the same as the one or more syntax elements used to transmit the information representing the at least one coefficient of the quantization matrix when the quantization matrix is not signaled using the prediction mode; and encoding the at least a portion of the video information based on the quantization matrix obtained from the reference quantization matrix and the information representing the at least one coefficient.

13. The method of claim 12, comprising encoding an index specifying the reference quantization matrix.

14. The method of claim 13, wherein the quantization matrix is determined to be signaled using the prediction mode based on a value of a flag indicating that the quantization matrix is derived from coefficients of the reference quantization matrix and on a value of the encoded index being greater than 0.

15. The method of claim 12, wherein the reference quantization matrix is a previously reconstructed quantization matrix.

16. A non-transitory computer readable medium storing a bitstream, formatted to include syntax elements and encoded video information in accordance with the method of claim 12.

17. An apparatus comprising:

one or more processors configured to:

obtain video information and information representing at least one coefficient of a quantization matrix associated with at least a portion of the video information;

signal, in a bitstream, that the quantization matrix is signaled using a prediction mode wherein the quantization matrix is predicted from a reference quantization matrix;

responsive to determining that the quantization matrix is signaled using the prediction mode, interpret the information representing the at least one coefficient of the quantization matrix as a residual between the quantization matrix and the reference quantization matrix;

signal, in the bitstream, a syntax element specifying that the information representing the at least one coefficient of the quantization matrix is transmitted;

signal in the bitstream, the information representing the at least one coefficient of the quantization matrix based on the syntax element, wherein one or more syntax elements used to transmit the information representing the at least one coefficient of the quantization matrix when the quantization matrix is signaled using the prediction mode are the same as the one or more syntax elements used to transmit the information representing the at least one coefficient of the quantization matrix when the quantization matrix is not signaled using the prediction mode; and encode the at least a portion of the video information based on the quantization matrix obtained from the reference quantization matrix and the information representing the at least one coefficient.

18. The apparatus of claim 17, wherein the one or more processors are configured to encode an index specifying the reference quantization matrix.

19. The apparatus of claim 18, wherein the quantization matrix is determined to be signaled using the prediction mode based on a value of a flag indicating that the quantization matrix is derived from coefficients of the reference quantization matrix and on a value of the encoded index being greater than 0.

20. The apparatus of claim 17, wherein the reference quantization matrix is a previously reconstructed quantization matrix.

* * * * *